(12) United States Patent
Takano

(10) Patent No.: US 8,529,179 B2
(45) Date of Patent: Sep. 10, 2013

(54) METHOD OF MANUFACTURING A VEHICULAR TRACTION APPARATUS AND A VEHICULAR TRACTION HOOK, AND METHOD OF MANUFACTURING A VEHICULAR CONNECTING MEMBER

(75) Inventor: Takeji Takano, Kawasaki (JP)

(73) Assignee: Faltec Co., Ltd., Kanagawa (JP)

( * ) Notice: Subject to any disclaimer, the term of this patent is extended or adjusted under 35 U.S.C. 154(b) by 221 days.

(21) Appl. No.: 12/311,040

(22) PCT Filed: Apr. 7, 2008

(86) PCT No.: PCT/JP2008/000888
§ 371 (c)(1),
(2), (4) Date: Mar. 17, 2009

(87) PCT Pub. No.: WO2008/129860
PCT Pub. Date: Oct. 30, 2008

(65) Prior Publication Data
US 2010/0003103 A1 Jan. 7, 2010

(30) Foreign Application Priority Data
Apr. 17, 2007 (JP) ................. 2007-107724

(51) Int. Cl.
*F16B 23/00* (2006.01)
(52) U.S. Cl.
USPC .......................... 411/400; 294/215; 248/503
(58) Field of Classification Search
USPC ................. 411/400, 401, 923; 248/499, 503; 410/101; 294/215
See application file for complete search history.

(56) References Cited

U.S. PATENT DOCUMENTS

| | | | | |
|---|---|---|---|---|
| 1,110,578 A | * | 9/1914 | Schutte | 24/135 R |
| 1,867,574 A | * | 7/1932 | Lekan | 294/82.1 |
| 2,246,457 A | * | 6/1941 | Schultz | 403/217 |
| 2,411,629 A | * | 11/1946 | Lane | 411/400 |
| 3,531,834 A | * | 10/1970 | Per-Olaf | 24/579.11 |
| 3,707,107 A | * | 12/1972 | Bieri | 411/423 |
| 3,896,867 A | * | 7/1975 | Gill et al. | 411/353 |
| 4,068,856 A | * | 1/1978 | Harris | 411/400 |
| 4,295,765 A | * | 10/1981 | Burke | 410/101 |
| 4,493,136 A | * | 1/1985 | Groutage et al. | 24/573.09 |
| 4,615,554 A | * | 10/1986 | Schilla et al. | 294/89 |
| 5,118,061 A | * | 6/1992 | Byrne et al. | 248/231.9 |
| 5,125,861 A | * | 6/1992 | Freeman | 411/400 |
| 5,865,416 A | * | 2/1999 | Hanaway | 248/551 |
| D413,509 S | * | 9/1999 | Robertson | D8/387 |

(Continued)

FOREIGN PATENT DOCUMENTS

| | | |
|---|---|---|
| JP | 4-39911 | 4/1992 |
| JP | 5-208222 | 8/1993 |

(Continued)

*Primary Examiner* — Gary Estremsky
(74) *Attorney, Agent, or Firm* — Jordan and Hamburg LLP

(57) ABSTRACT

A vehicular traction apparatus is manufactured which includes a connecting member having a female thread portion mountable to a vehicular side and a traction hook. At one end of the traction hook is a male thread portion screwable into the female thread portion and at the other end thereof is a hook portion to which a traction member is mountable. An original position and/or a terminal portion of the male thread portion of the traction hook is arranged in a predetermined position relative to the hook portion. After the male portion is clamped to the connecting member, position of the hook member is settable in a predetermined, allowable angle position.

15 Claims, 18 Drawing Sheets

(56) References Cited

U.S. PATENT DOCUMENTS

| | | | |
|---|---|---|---|
| 6,276,285 B1 * | 8/2001 | Ruch | 108/57.13 |
| 6,652,012 B1 * | 11/2003 | Fuller et al. | 294/1.1 |
| 6,994,501 B2 * | 2/2006 | Smetz | 411/400 |
| 7,753,416 B2 * | 7/2010 | Mazzaferro et al. | 285/333 |
| 2007/0183866 A1 * | 8/2007 | Gallien | 411/401 |

FOREIGN PATENT DOCUMENTS

| | | |
|---|---|---|
| JP | 8-090138 | 4/1996 |
| JP | 11-138233 | 5/1999 |
| JP | 2000-202567 | 7/2000 |
| JP | 2003-002136 | 1/2003 |
| JP | 2004-136745 | 5/2004 |
| JP | 2004-237371 | 8/2004 |

* cited by examiner

PROCEDURE OF MANUFACTURE OF TRACTION HOOK

RAW MATERIAL

HEATING

FORGING

BURR REMOVAL, COMPLETION

PROCEDURE OF MANUFACTURE OF CONNECTING MEMBER

RAW MATERIAL

HEATING

FORGING

BURR REMOVAL

INTERLOCKING PROCESS

COMPLETION

PROCEDURE OF MANUFACTURE OF CONNECTING MEMBER

RAW MATERIAL

HEATING

CORE SHAFT INSERTION AND FORGING

CORE SHAFT PULLED OUT

BURR REMOVAL

INTERLOCKING PROCESS

COMPLETION

METHOD OF MANUFACTURING A VEHICULAR TRACTION APPARATUS AND A VEHICULAR TRACTION HOOK, AND METHOD OF MANUFACTURING A VEHICULAR CONNECTING MEMBER

BACKGROUND OF THE INVENTION

The present invention relates to a method of manufacturing a vehicular traction apparatus, which is suited to, for example, an automobile traction apparatus and mounted with a hook portion of a traction hook in a predetermined orientation to a connecting member on a side of an automobile, and in which generation of rolling and looseness of the traction hook by vibrations and an external force at the time of traction is prevented, reliability and safety in traction are ensured, the traction hook is smoothly mounted to the connecting member, and it is possible to increase the parts in strength, to make them small in size and weight, to facilitate processing them, and to manufacture them at low cost, and a vehicular traction hook, and a method of manufacturing a vehicular connecting member.

A conventional automobile traction hook is mounted to a vehicle body to be used at the time of shipping by a ship or the like for automobiles or traction and comprises a male thread portion provided at one end of a shank portion made of, for example, steel and a hook portion provided at the other end thereof to enable a wire rope or the like to be latched thereon, the male thread portion is screwed into a female thread portion of a hook stay fixed behind a bumper in use to be clamped, one end of the wire rope is latched on the hook portion, and the other end of the wire rope is mounted to a pulled side or an immovable portion (see, for example, Patent Document 1).

Since the male thread portion is worked irrespective of a mount position or orientation of the hook, however, the hook is diversified in mount position or orientation when the male thread portion is screwed into the female thread portion to be fixed, thus causing a problem that at the time of traction of an automobile with the use of the hook portion, a bending moment or vibrations generated by the wire rope as set loosen a part of the hook portion to cause looseness or rolling to lead to decrease traction in safety and reliability.

In particular, in case of shipping an automobile by a ship, while traction hooks are mounted to front and rear portions of the automobile, lengths of wire rope are set on the hooks, and one ends of the lengths of wire rope are moored immovably to the ship, the automobile moves following a complex behavior at the time of navigation and thread portions of parts of the hooks are loosened by a bending moment or vibrations generated by the wire rope and further acted repeatedly by a complexly acting force, thus causing a problem that the looseness or the bending moment increases to cause a damage to mooring in safety and so shipping of the automobile is damaged in safety and reliability.

When looseness is generated in the hook portion, a larger stress than that at an ordinary occasion is generated on the thread portions to give rise to a fear of insufficiency thereof in strength, so that in anticipation of looseness in the thread portions, there is adopted measures of an increase in strength, such as an increase in diameter of the thread portions.

Accordingly, this case involves a problem that traction hooks are made large in size and weight and correspondingly take much time in manufacture to become expensive or the like.

Hereupon, in order to solve such problem, there is conceivable a method of subjecting a traction hook and a connecting member, into which the traction hook is screwed, to forged forming to increase the same in strength, subjecting thread worked portions to pre-working with accuracy, and cutting peripheral surfaces thereof with dies, or rolling to work thread portions.

In this case, however, there is a disadvantage that much time is taken in working of thread portions to cause an increase in manufacturing cost, even when a traction hook and a connecting member are specially subjected to forged forming, grain flows are parted by cutting working or rolling working and a predetermined strength by the grain flows is lost.

Also, with the thread working, working is impossible to make a mount position or orientation of a hook fixed, and so a fear in safety at the time of traction cannot be eliminated.

Therefore, with a view to solving the problem, there exists a forming method, in which a core formed on an outer periphery thereof with a male thread portion is made of a hard metal being a sintered alloy, in a state, in which the core is inserted into a hole formed on a metallic, forming raw material, the forming raw material hot forging by upper and lower dies, forged forming is used to form female threads on the hole, then one of the forged part and the core is rotated to permit the core to be pulled out from a female thread portion, and forged forming is used to form female threads on an inner surface of the hole of the forming raw material (see, for example, Patent Document 2).

Also, a lower die having a cavity formed with a female thread portion is made of a hard metal being a sintered alloy, a metallic, forming raw material is inserted into the cavity, the raw material is subjected to hot forging by upper and lower dies, forged forming is used to form male threads on a peripheral surface of the raw material, then a forged part is pulled out from the female thread portion with the upper die removed and the metallic die locked in rotation, and male threads are formed on the peripheral surface of the raw material (see, for example, Patent Document 2).

Since the conventional thread part is subjected to thread forming irrespective of a position, in which it is clamped, however, the clamped position is diversified and so cannot be adopted for an automobile traction hook.

Besides, with the method of forged-forming female threads, it is difficult to have the upper and lower dies pushing a single forming raw material to definitely and uniformly form female threads on the inner surface of the hole, and with the method of forged-forming male threads, the metallic die is pushed in an axial direction of the forming raw material to cause a problem that a large capacity is required of a forging machine to lead to a high installation cost.

Hereupon, with a view to solving the problem, there exists a method of forming male threads, in which method a pair of metallic dies provided on an inner surface thereof with a portion having screw teeth and a portion having no screw teeth are arranged oppositely, a forming raw material as heated is arranged between the metallic dies, the metallic dies are caused to approach and move to form screw teeth and non-screw teeth on a peripheral surface of the raw material (see, for example, Patent Document 3).

Since the conventional thread part is subjected to thread forming irrespective of a position, in which it is clamped, however, the clamped position is diversified and the thread portion is triangular in cross section, small in strength, and large in screw pitch to be liable to cause looseness, so that it cannot be adopted for an automobile traction hook, on which a large load is applied and for which it is essential to ensure safety.

Patent Document 1: JP-A-2003-2136
Patent Document 2: JP-A-8-90138
Patent Document 3: JP-A-2000-202567

SUMMARY OF THE INVENTION

The present invention solves such problem and has its object to provide a method of manufacturing a vehicular traction apparatus, which is suited to, for example, an automobile traction apparatus and mounted with a hook portion of a traction hook in a predetermined orientation to a connecting member on a side of an automobile, and in which generation of rolling and looseness of the traction hook by vibrations and an external force at the time of traction is prevented, reliability and safety in traction are ensured, the traction hook is smoothly mounted to the connecting member, and it is possible to increase the parts in strength, to make them small in size and weight, to facilitate processing them, and to manufacture them at low cost, and a vehicular traction hook, and a method of manufacturing a vehicular connecting member.

The invention, in a first aspect, provides a vehicular traction apparatus including a connecting member having a female thread portion that can be mounted to a vehicular side, and a traction hook provided at one end thereof with a male thread portion that can be screwed into the female thread portion, and provided at the other end thereof with a hook portion, to which a traction member can be mounted, the vehicular traction apparatus being characterized in that an original position and/or a terminal position of the male thread portion of the traction hook is arranged in a predetermined position relative to the hook portion and after the male thread portion is clamped to the connecting member, a position of the hook portion can be set in a predetermined, allowable angle position, a screwing beginning position and/or a screwing terminating position of the male thread portion into the female thread portion is determined, whereby a bending moment or vibrations generated by a wire rope mounted to the hook portion is prevented from making the male thread portion loose and thus reliability and safety in traction or mooring by the hook portion are ensured.

Accordingly, a conventional disadvantage that in anticipation of generation of looseness in the male thread portion, the traction hook or the connecting member is increased in size and weight, is eliminated and the traction hook or the connecting member is made small in size and weight.

According to a second aspect of the invention of, the predetermined, allowable angle position of the hook portion is in a predetermined angle range, in which a bending moment of the hook portion generated by the traction member can act in a direction, in which the male thread portion is clamped, so that it is possible to prevent generation of looseness of the male thread portion caused by a wire rope or the like.

According to a third aspect of the invention, a position of the hook portion after the clamping is set to be directed obliquely downward in a position of substantially 100° to 150° with a flat surface of the hook portion as a reference, whereby a position of the hook portion after the clamping is reasonably set so that a bending moment or vibrations generated by a wire rope, etc. mounted to the hook portion is prevented from making the male thread portion loose and reliability and safety in traction or mooring by the hook portion are ensured.

According to a fourth aspect of the invention, a single or plural flange portions are protrusively provided in a position close to the male thread portion, the flange portion or portions being arranged to be able to engage with an inner surface of a concave hole of the connecting member, whereby rolling of the traction hook is prevented, so that it is possible to prevent generation of an alternating load and a repeated stress on the male thread portion and generation of looseness.

According to a fifth aspect of the invention, a flat surface capable of engaging with the inner surface of the concave hole is formed on an outer peripheral surface of the flange portion and a wide area of an engaging surface with an inner surface of the concave hole is ensured, whereby it is possible to suppress rolling of the traction hook and to prevent generation of an alternating load and a repeated stress on the male thread portion and generation of looseness.

In particular, this is advantageous in a traction hook, on which a single flange portion is protrusively provided.

According to a sixth aspect of the invention, an interval between the plural flange portions is in the range of 1/2 to 2/1 a diameter of a shank positioned between the flange portions whereby both prevention of rolling of the traction hook and acquisition of strength for the flange portion are reasonably accomplished.

According to a seventh aspect of the invention, side cut portions, on which male threads are not worked, are formed on both sides of the male thread portion whereby even when sand, dust, etc. adhere to the female thread portion of the connecting member, the side cut portions scrape out sand, dust, etc., as adhered at the time of screwing of the male thread portion to prevent the male thread portion from galling, thus enabling smooth screwing.

This is advantageous in the case where the connecting member is mounted to a body frame around a bumper or the like, to which sand, dust, etc. are liable to adhere, and generation of galling can be effectively prevented since the male thread portion and the female thread portion, which screw together, are large in diameter and screw pitch.

According to an eighth aspect of the invention, the male thread portion of the traction hook and the female thread portion of the connecting member comprise a plurality of thread ridges with trapezoidal threads or round threads whereby the thread portions are increased in strength and a strength of connection capable of withstanding an alternating load and a repeated stress on the male thread portion is obtained.

According to a ninth aspect of the invention, the male thread portion and the female thread portion are formed to be substantially the same in thread portion length whereby the hook portion is made stable in a clamped position and a predetermined strength of connection for the traction hook and the connecting member is obtained.

According to a tenth aspect of the invention, the hook portion, the male thread portion and the flange portion of the traction hook are integrally subjected to forged forming and the traction hook is subjected to forged forming at a time whereby a tough strength is obtained and manufacture is made reasonable.

According to an eleventh aspect of the invention, the female thread portion of the connecting member is formed corresponding to the original position and/or the terminal position of the male thread portion of the traction hook whereby a clamped position of the hook portion can be surely and stably realized.

According to a twelfth aspect of the invention, the connecting member is provided with the female thread portion and a concave hole whereby screwing of the male thread portion of the traction hook and engagement by the flange portion are realized.

According to a thirteenth aspect of the invention, a positioning portion for a vehicular side is formed on an outer peripheral surface of the connecting member whereby the connecting member is mounted in a predetermined position on a vehicular side.

According to a fourteenth aspect of the invention, the connecting member is divided into a plurality of connecting pieces, the connecting pieces are provided with the female thread portions and concave holes, and the connecting pieces are connected together whereby the connecting member is manufactured reasonably and readily.

According to a fifteenth aspect of the invention, the female thread portions and the concave holes of the connecting member are integrally subjected to forged forming whereby the connecting member is increased in strength and manufactured reasonably.

According to a sixteenth aspect of the invention, the concave and convex portions of the connecting pieces for positioning are integrally subjected to forged forming whereby the concave and convex portions are formed exactly and uniformly to enable exact connection of the plurality of connecting pieces.

The invention, in a seventeenth aspect, provides a method of manufacturing a vehicular traction hook, the method comprising providing, inside a pair of metallic dies capable of approaching and separating from each other, hook forming grooves capable of forming a hook portion of a traction hook, flange forming grooves capable of forming a flange portion of the traction hook, and male thread forming grooves capable of forming a male thread portion of the traction hook, arranging, on the male thread forming grooves, an original position and/or a terminal position of the male thread portion in a predetermined position relative to the hook forming grooves, arranging a forming raw material as heated between the metallic dies, and causing the metallic dies to approach and move to form the hook portion, single or plural flange portions, and the male thread portion on a peripheral surface of the raw forming material, whereby the traction hook is manufactured homogeneously and exactly, an original position and a terminal position of the male thread portion are formed evenly and uniformly, and a predetermined clamped position of the hook portion of the traction hook is obtained surely and stably.

According to an eighteenth aspect of the invention, the male thread forming grooves comprise a plurality of thread ridges with trapezoidal threads or round threads whereby it is possible to exactly form the male thread portion of the traction hook.

According to a nineteenth aspect of the invention, after the flange portion is cooled at ordinary temperature, an outer peripheral surface of the flange portion is subjected to coining forming whereby it is possible to accurately and readily form a flat surface capable of engaging with the inner surface of the concave hole of the connecting member.

The invention, in a twentieth aspect provides a method of manufacturing a vehicular connecting member, the method comprising protrusively providing, on one of a pair of metallic dies capable of approaching and separating from each other, a substantially semi-columnar thread forming portion formed on a circumferential surface thereof with a thread portion, which can form female threads of a connecting member, forming, on the other of the metallic dies, a concave groove capable of accommodating therein a forming raw material, arranging a forming raw material as heated between the metallic dies, causing the metallic dies to approach and move to forged-form split connecting pieces of the connecting member, and forged-forming female threads on concave, circumferential surfaces of the connecting pieces whereby it is possible to reasonably manufacture connecting pieces obtained by dividing the connecting member.

According to a twenty-first aspect of the invention, flat joint surfaces are formed on both sides of the connecting pieces, and a plurality of concave and convex portions are subjected to forged forming on the joint surfaces whereby it is possible to surely connect the connecting pieces, in which the joint surfaces and the concave and convex portions are used, thus enabling manufacturing a uniform connecting member.

According to a twenty-second aspect of the invention, after forged-forming of a pair of split connecting pieces, joint surfaces thereof are joined and concave and convex portions are fitted to be connected together whereby it is possible to surely and readily connect the connecting pieces, thus enabling obtaining a uniform connecting member.

According to a twenty-third aspect of the invention, a plurality of thread ridges with trapezoidal threads or round threads are formed on a circumferential surface of the thread forming portion whereby it is possible to form female threads in the form of trapezoidal threads or round threads on the connecting pieces.

According to a twenty-fourth aspect of the invention, out of respective pairs of forging metallic dies for the pair of connecting pieces, one of the metallic dies formed with a concave groove that can accommodate therein a forming raw material is made capable of shared use whereby reasonable design and use of metallic dies are achieved and a manufacturing facility is made small in cost.

According to the first aspect of the invention, since an original position and/or a terminal position of the male thread portion of the traction hook is arranged in a predetermined position relative to the hook portion and after the male thread portion is clamped to the connecting member, a position of the hook portion can be set in a predetermined, allowable angle position, by determining a screwing beginning position and/or a screwing terminating position of the male thread portion into the female thread portion, a bending moment or vibrations generated by a wire rope, etc. mounted to the hook portion can be prevented from making the male thread portion loose and reliability and safety in traction or mooring by the hook portion can be ensured.

Accordingly, a conventional disadvantage that in anticipation of generation of looseness in the male thread portion, the traction hook or the connecting member is increased in size and weight, is eliminated and the traction hook or the connecting member is made small in size and weight.

According to the second aspect of the invention, since the predetermined, allowable angle position of the hook portion is in a predetermined angle range, in which a bending moment of the hook portion generated by the traction member can act in a direction, in which the male thread portion is clamped, it is possible to prevent generation of looseness of the male thread portion caused by a wire rope or the like.

According to a third aspect of the invention, since a position of the hook portion after the clamping is set to be directed obliquely downward in a position of substantially 100° to 150° with a flat surface of the hook portion as a reference, a position of the hook portion after the clamping is reasonably set so that a bending moment or vibrations generated by a wire rope, etc. mounted to the hook portion is prevented from making the male thread portion loose and reliability and safety in traction or mooring by the hook portion are ensured.

According to the fourth aspect of the invention, since a single or plural flange portions are protrusively provided in a position close to the male thread portion, the flange portion or portions being arranged to be able to engage with an inner surface of a concave hole of the connecting member, it is possible to prevent rolling of the traction hook and to prevent generation of an alternating load and a repeated stress on the male thread portion and generation of looseness.

According to the fifth aspect of the invention, since a flat surface capable of engaging with the inner surface of the concave hole is formed on an outer peripheral surface of the flange portion, a wide area for engagement with an inner surface of the concave hole is ensured, whereby it is possible to suppress rolling of the traction hook and to prevent generation of an alternating load and a repeated stress on the male thread portion and generation of looseness.

In particular, this is advantageous in a traction hook, on which a single flange portion is protrusively provided.

According to the sixth aspect of the invention, since an interval between the plural flange portions is in the range of 1/2 to 2/1 a diameter of a shank positioned between the flange portions, there is produced an effect that both prevention of rolling of the traction hook and acquisition of a strength for the flange portion are reasonably accomplished.

According to the seventh aspect of the invention, since side cut portions, on which male threads are not worked, are formed on both sides of the male thread portion, even when sand, dust, etc. adhere to the female thread portion of the connecting member, the side cut portions scrape out sand, dust, etc., as adhered at the time of screwing of the male thread portion to prevent the male thread portion from galling, thus enabling smooth screwing.

This is advantageous in the case where the connecting member is mounted to a body frame around a bumper or the like, to which sand, dust, etc. are liable to adhere, and generation of galling can be effectively prevented since the male thread portion and the female thread portion, which screw together, are large in diameter and screw pitch.

According to the eighth aspect of the invention, since the male thread portion of the traction hook and the female thread portion of the connecting member comprise a plurality of thread ridges with trapezoidal threads or round threads, the thread portions can be increased in strength and a strength of connection capable of withstanding an alternating load and a repeated stress on the male thread portion can be obtained.

According to the ninth aspect of the invention, since the male thread portion and the female thread portion are formed to be substantially the same in thread portion length, the hook portion can be made stable in a clamped position and a predetermined strength of connection for the traction hook and the connecting member can be obtained.

According to the tenth aspect of the invention, since the hook portion, the male thread portion and the flange portion of the traction hook are integrally subjected to forged forming, the traction hook is subjected to forged forming at a time whereby a tough strength can be obtained and manufacture can be made reasonable.

According to the eleventh aspect of the invention, since the female thread portion of the connecting member is formed corresponding to the original position and/or the terminal position of the male thread portion of the traction hook, a clamped position of the hook portion can be surely and stably realized.

According to the twelfth aspect of the invention, since the connecting member is provided with the female thread portion and a concave hole, it is possible to realize screwing of the male thread portion of the traction hook and engagement by the flange portion.

According to the thirteenth aspect of the invention, since a positioning portion for a vehicular side is provided on an outer peripheral surface of the connecting member, the connecting member can be mounted in a predetermined position on a vehicular side.

According to the fourteenth aspect of the invention, since the connecting member is divided into a plurality of connecting pieces, the connecting pieces are provided with the female thread portions and concave holes, and the connecting pieces are connected together, the connecting member can be manufactured reasonably and readily.

According to the fifteenth aspect of the invention, since the female thread portions and the concave holes of the connecting member are integrally subjected to forged forming, the connecting member can be increased in strength and manufactured reasonably.

According to the sixteenth aspect of the invention, since the concave and convex portions of the connecting pieces for positioning are integrally subjected to forged forming, the concave and convex portions can be formed exactly and uniformly to achieve exact connection of the plurality of connecting pieces.

According to the seventeenth aspect of the invention, since hook forming grooves capable of forming a hook portion of a traction hook, flange forming grooves capable of forming a flange portion of the traction hook, and male thread forming grooves capable of forming a male thread portion of the traction hook are provided inside a pair of metallic dies capable of approaching and separating from each other, an original position and/or a terminal position of the male thread portion is arranged on the male thread forming grooves in a predetermined position relative to the hook forming grooves, a forming raw material as heated is arranged between the metallic dies, and the metallic dies are caused to approach and move to form the hook portion, single or plural flange portions, and the male thread portion on a peripheral surface of the raw forming material, there is produced an effect that the traction hook can be manufactured homogeneously and exactly, an original position and a terminal position of the male thread portion can be formed evenly and uniformly, and a predetermined clamped position of the hook portion of the traction hook can be obtained surely and stably.

According to the eighteenth aspect of the invention, since the male thread forming grooves comprise a plurality of thread ridges with trapezoidal threads or round threads, it is possible to exactly form the male thread portion of the traction hook.

According to the nineteenth aspect of the invention, since after the flange portion is cooled at ordinary temperature, an outer peripheral surface of the flange portion is subjected to coining forming, it is possible to accurately and readily form a flat surface capable of engaging with the inner surface of the concave hole of the connecting member.

According to the twentieth aspect of the invention, since a substantially semi-columnar thread forming portion formed on a circumferential surface thereof with a thread portion, which can form female threads of a connecting member, is protrusively provided on one of a pair of metallic dies capable of approaching and separating from each other, a concave groove capable of accommodating therein a forming raw material is formed on the other of the metallic dies, a forming raw material as heated is arranged between the metallic dies, the metallic dies are caused to approach and move to forged-form split connecting pieces of the connecting member, and female threads are formed on concave, circumferential surfaces of the connecting pieces, it is possible to reasonably manufacture connecting pieces obtained by dividing the connecting member.

According to the twenty-first aspect of the invention, since flat joint surfaces are formed on both sides of the connecting pieces, and a plurality of concave and convex portions are forged-formed on the joint surfaces, it is possible to surely connect the connecting pieces, in which the joint surfaces and the concave and convex portions are used, thus enabling manufacturing a uniform connecting member.

According to the twenty-second aspect of the invention, since after forged-forming of a pair of split connecting pieces, joint surfaces thereof are joined and concave and convex portions are fitted to be connected together, there is produced an effect that it is possible to surely and readily connect the connecting pieces, thus enabling obtaining a uniform connecting member.

According to the twenty-third aspect of the invention, since a plurality of thread ridges with trapezoidal threads or round threads are formed on a circumferential surface of the thread forming portion, it is possible to form female threads in the form of trapezoidal threads or round threads on the connecting pieces.

According to the twenty-fourth aspect of the invention, since out of respective pairs of forging metallic dies for the pair of connecting pieces, one of the metallic dies formed with a concave groove that can accommodate therein a forming raw material is made capable of shared use, reasonable design and use of metallic dies can be achieved and a manufacturing facility can be made small in cost.

BRIEF DESCRIPTION OF THE DRAWINGS

FIG. 11 is a perspective view showing a connecting member applied to the invention and structured by connecting two connecting pieces.

FIG. 12 is a perspective view showing, in a little enlarged scale, the connecting member of FIG. 11 in a disassembled state.

DETAILED DESCRIPTION OF THE INVENTION

Figure 1:
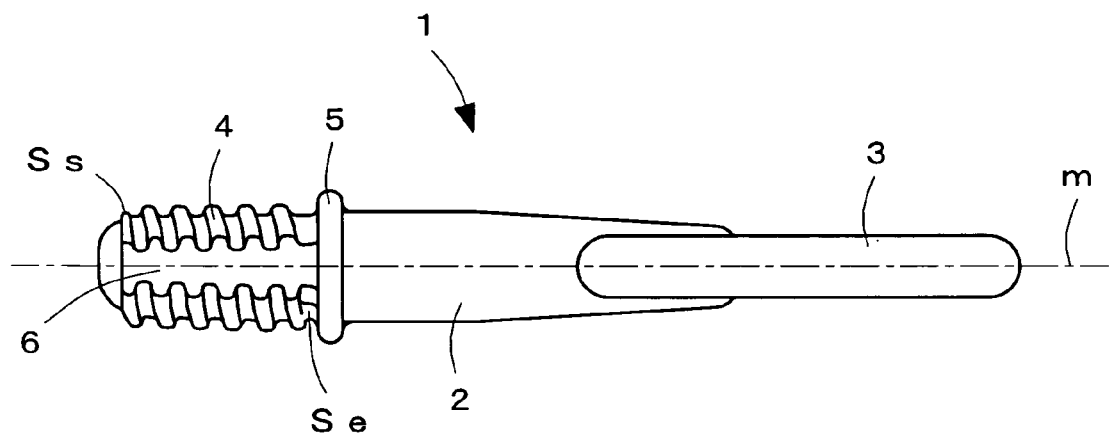
FIG. 1 is a front view showing an embodiment, in which the invention is applied to an automobile traction hook.
Figure 2:
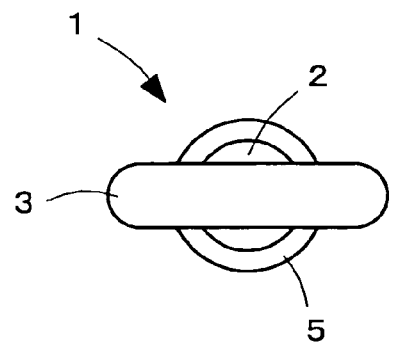
FIG. 2 is a right side view of FIG. 1.

An explanation will be given below to an embodiment, which is shown and in which the invention is applied to an automobile traction hook, and in FIGS. 1 to 15 and 30, the reference numeral 1 denotes a traction hook, which is made by forged forming and can be mounted to a body frame, described later, about a bumper of an automobile 7, the traction hook comprising a round bar shaped shank 2, an annular hook portion 3 provided at an end of the shaped shank 2 to enable a wire rope W or the like, which is a traction member, to be latched thereon, a right-hand thread male thread portion 4, which is provided at the other end of the shaped shank 2 and can be screwed into a connecting member, described later, mounted to the body frame, and a flange portion 5 protrusively provided at a boundary of the shaped shank 2 and the male thread portion 4.

In the drawings, the reference numeral 6 denotes side cut portions formed on both sides of the male thread portion 4 to be perpendicular to a flat surface of the hook portion 3, so that the male thread portion 4 is not formed on the cut portions 6 and extraction slopes are formed on surfaces above and below die matching portions thereof in mutually different directions.

Figure 6:
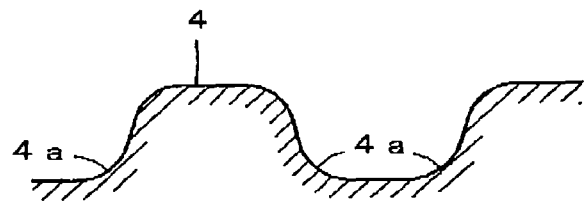
FIG. 6 is a cross sectional view showing, in enlarged scale, the male thread portion of the traction hook.

The hook portion 3 is formed integral with the shaped shank 2 to be shaped in the form of a ring having a large diameter and the male thread portion 4 is made integral with the shaped shank 2 to comprise trapezoidal threads as shown in FIG. 6, the trapezoidal threads being formed at corners of valleys thereof with round portions 4a of a relatively large diameter or curved surface portions to be increased in strength.

In this case, the male thread portion 4 is not limited to trapezoidal threads but can comprise round threads.

Figure 15:
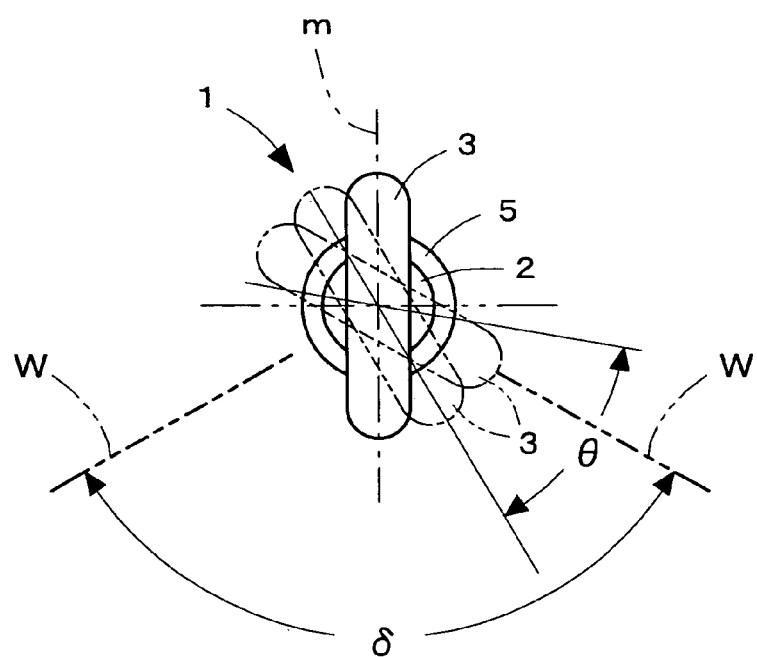
FIG. 15 is a side view showing a position, in which a hook portion is mounted when a traction hook according to the invention is clamped.

When a traction hook 1 is clamped to the connecting member to be used, the male thread portion 4 is formed at substantially 100° to 150° in a clockwise direction to a straight line m in parallel to a flat surface of the hook portion 3 with the hook portion 3 being directed obliquely downward as shown in FIG. 15 and imaginary lines shown in the figure indicate the hook portion 3 in both positions at substantially 120° and 150°, of which an allowable angle θ is set in the range of substantially 50°, and an original position Ss and a terminal position Se of the male thread portion 4 are designed correspondingly.

That is, the allowable angle θ is set in the range of such an allowable angle that when the traction hook 1 is used, the hook portion 3 is turned by a bending moment or vibrations generated by the set wire rope W in a direction, in which the male thread portion 4 is clamped, so that safety is accordingly ensured in use to inhibit the male thread portion 4 from being made loose, the allowable angle θ being formed in the original position Ss and the terminal position Se of the male thread portion 4.

Figure 4:
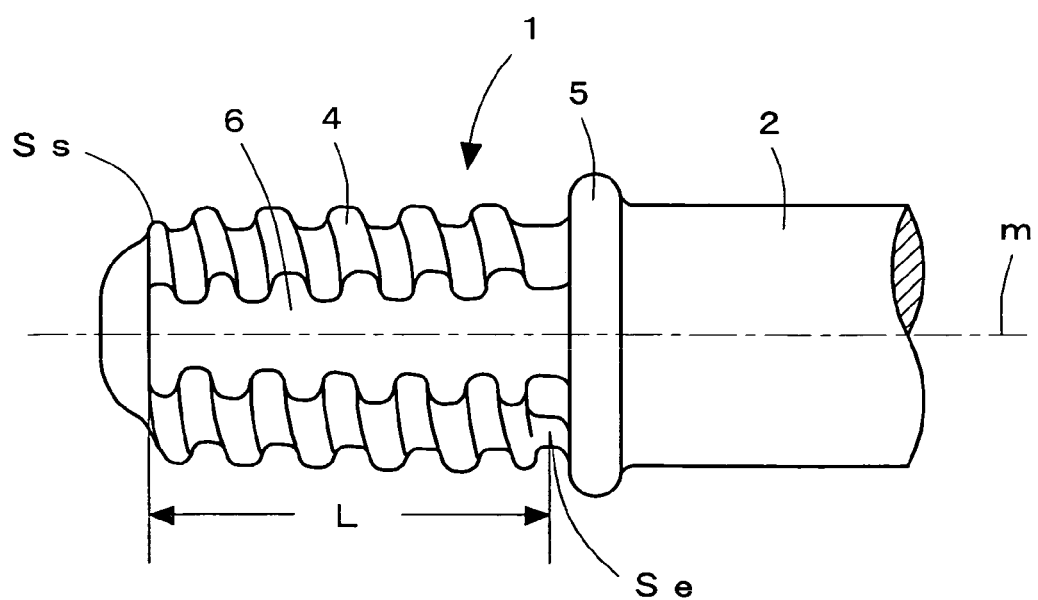
FIG. 4 is a front view showing, in enlarged scale, an essential part of FIG. 1 and showing a male thread portion of the traction hook, an original position and a terminal position of the thread portion.
Figure 5:
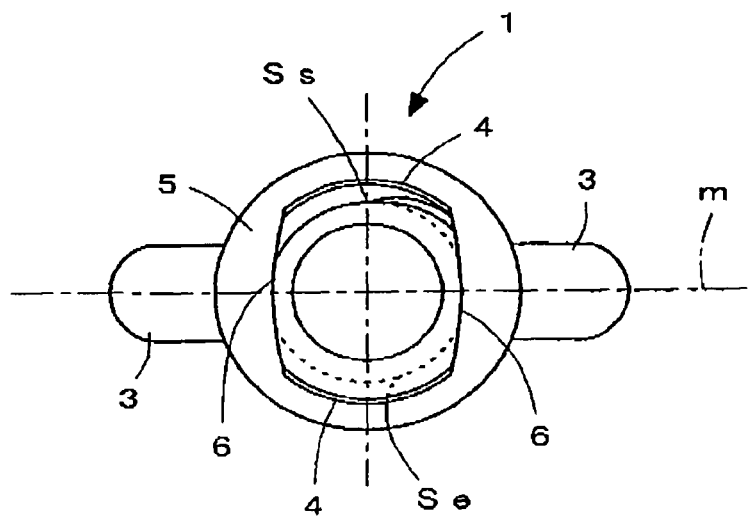
FIG. 5 is a left side view of FIG. 4.

The original position Ss corresponds to a foremost position, in which thread ridges of the male thread portion 4 originate and the thread ridges are first screwed into female threads of the mating connecting member, the position being shown in FIGS. 4 and 5.

Also, with the embodiment, the terminal position Se corresponds to a position, in which the thread ridges of the male thread portion 4 terminate, and corresponds to a position, in which the thread ridges are finally screwed into a terminal end of the female threads of the mating connecting member, the position being shown in FIGS. 4 and 5.

A thread portion length L is defined between the original position Ss and the terminal position Se of the male thread portion 4, the thread portion length L being related to a strength of connection after the male thread portion 4 is clamped to the connecting member, and the number of and a screw pitch of the thread ridges being designed on the basis of the thread portion length L.

In this case, instead of a position, in which the thread ridges terminate, the terminal position Se can be made a position of collapse or breakage or interruption in the case where the male thread portion 4 is collapsed or broken or interrupted in a predetermined position and screwing into the female threads is made impossible.

A diameter between the side cut portions 6, 6 is made a little smaller than a root diameter of the male thread portion 4, and the male thread portion 4 is screwed into a female thread portion 9 of the connecting member 8 fixed to the rigid body frame 7 to be clamped.

The traction hook 1 is manufactured by forged forming of a stiff carbon steel, chromium-molybdenum steel, etc., which is a forming raw material 10, and FIG. 8 shows a procedure of manufacture.

Figure 8A:
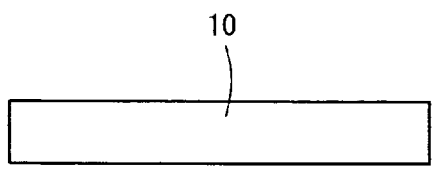
FIG. 8 is a view illustrating a procedure of manufacture of the traction hook, FIG. 8(a) showing a situation after a forming raw material is cut, FIG. 8(b) showing a situation of heating of the forming raw material thus cut, FIG. 8(c) showing a situation just after forged forming, FIG. 8(d) showing a situation, in which a burr after forged forming is removed to complete manufacture.
Figure 8B:
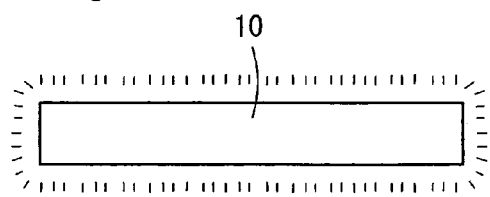
Figure 8C:
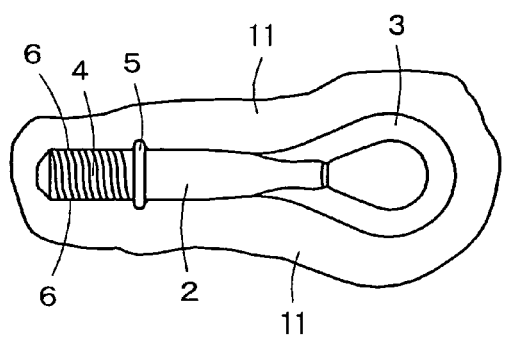

That is, the forming raw material 10 is cut to a predetermined dimension as shown in FIG. 8(a) and heated to about 1200° C. to 1400° C. as shown in FIG. 8(b), and then the whole traction hook 1 including the male thread portion 4 is subjected to high-temperature hot forging at a time as shown in FIG. 8(c) by a forging machine (not shown).

Figure 8D:
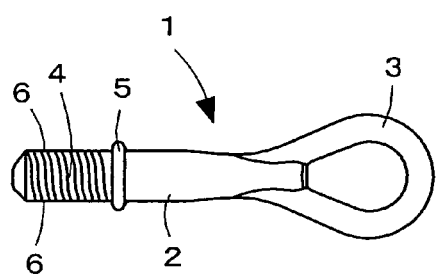

At this time, before a burr 11 projecting circumferentially is cooled, it is punched interlocking with forging to manufacture the traction hook 1 as shown in FIG. 8(d).

Accordingly, there is no need for complex, troublesome and accurate pre-working of the male thread portion 4 and working of threads by machining or rolling or the like as in the related art, so that manufacture can be performed readily and rapidly.

In forged forming of the traction hook 1, a pair of metallic dies 12, 13 are used, the metallic dies 12, 13 being arranged up and down in opposition to each other and arranged to enable approaching and separating from each other.

Formed on the metallic dies 12, 13 are shank forming grooves 14a, 14b capable of forming the shank 2, hook forming grooves 15a, 15b capable of forming the hook 3, male-thread forming grooves 16a, 16b capable of forming the male thread portion 4, flange forming grooves 17a, 17b capable of forming the flange portion 5, and side cut forming grooves 18a, 18b capable of forming the side cut portions 6.

The male-thread forming grooves 16a, 16b are formed on the basis of the thread portion length L, the number of and a screw pitch of the thread ridges, an original end of the thread ridges is formed at a forward end of the male-thread forming groove 16a to be positioned corresponding to the original position Ss coaxial with the hook forming groove 15a and a terminal end of the thread ridges is formed at a rear end of the male-thread forming groove 16b to be positioned corresponding to the terminal position Se coaxial with the hook forming groove 15b.

On the other hand, the connecting member 8 is formed to be hollow-shaped and formed on a circumferential surface thereof with a positioning portion 19 for the body frame 7, the connecting member being fixed by engaging the positioning portion 19 with a mount hole 7a of the body frame 7 and welding the connecting member 8 to an opening edge of the mount hole.

The right-hand female thread portion 9 is formed on an intermediate portion of a through-hole of the connecting member 8 to have a thread portion length L being substantially the same as the thread portion length L of the male thread portion 4, and concave holes 20, 21 having a larger diameter than that of the female thread portion 9 are formed at both ends of the through-hole.

In this case, the male thread portion 4 and the female thread portion 9 are not necessarily formed to have substantially the same thread portion length L but are desirably formed to have substantially the same length as far as possible in the case where stability in threaded connection and a predetermined strength should be obtained.

The concave hole 20 is arranged outside the body frame 7 to receive the flange portion 5 in a manner to enable engaging the same with an inner peripheral surface thereof, thus enabling preventing rolling of the traction hook 1, and the concave hole 21 is arranged inside the body frame 7 to receive the male thread portion 4 with a tip end thereof projecting into the concave hole 21.

With the embodiment, the connecting member 8 comprises a pair of connecting pieces 8a, 8b as shown in FIGS. 11 and 12, the connecting pieces being joined by forged forming to be connected integrally to each other.

That is, the connecting pieces 8a, 8b are formed by dividing the connecting member 8 axially into substantially two halves and formed on opposite surfaces thereof with female thread portions 9a, 9b, which constitute the female thread portion 9, recessed grooves 20a, 20b, which constitute the concave hole 20, and recessed grooves 21a, 21b, which constitute the concave hole 21.

The female thread portions 9a, 9b are formed to be substantially the same in thread portion length L, number, and screw pitch of thread ridges as the male thread portion 4, which screws thereinto.

In the figure, the reference numerals 22, 23 denote flat joint surfaces of the connecting pieces 8a, 8b, the joint surfaces being formed with concave and convex portions 24, 25, which can fit each other, thus enabling positioning and connecting the connecting pieces 8a, 8b together. The reference numeral 26 denotes welds, at which joined portions of the connecting pieces 8a, 8b are connected together.

The connecting pieces 8a, 8b are manufactured by forged forming of carbon steel, chromium-molybdenum steel, etc. which is a forming raw material, respectively, and joining the pair in a predetermined position, and FIG. 14 shows a procedure of manufacture. In this case, since methods of manufacturing the connecting pieces 8a, 8b are substantially the same, an explanation will be given to manufacture of one 8b of the connecting pieces.

Figure 14A:
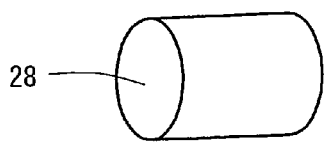
FIG. 14 is a view illustrating a procedure of manufacture of the connecting member of FIG. 11, FIG. 14(a) being a perspective view showing a situation after a forming raw material is cut, FIG. 14(b) being a perspective view showing a situation of heating of the forming raw material thus cut, FIG. 14(c) being a cross sectional view showing a situation just before forging by metallic dies used in forged forming, FIG. 14(d) being a cross sectional view showing a situation of forming just after forging, FIG. 14(e) showing a situation, in which a burr after forming is removed, and FIG. 14(f) being a perspective view showing a situation, in which a pair of metallic dies are joined and welded after forming to complete manufacture of a connecting member.
Figure 14B:
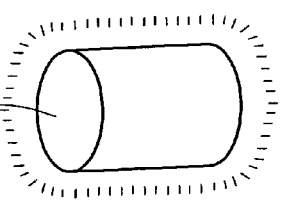

That is, with the connecting piece 8b, a round bar shaped forming raw material 28 is cut to a predetermined dimension as shown in FIG. 14(a), heated to about 1200° C. to 1400° C. as shown in FIG. 14(b), and is subjected to high-temperature hot forging at a time together with the female thread portions 9b by a forging machine (depiction of which is omitted).

Metallic dies 29, 30 are arranged up and down in opposition to each other on the forging machine (depiction of which is omitted), a substantially shell-shaped or substantially semi-circular thread forming portion 31 is protrusively provided centrally of a lower surface of the upper metallic die 29, and a male thread portion 32 capable of forming the female thread portions 9b is machined on an arcuate, peripheral surface of the thread forming portion 31. The male thread portion 32 is formed to be substantially the same in thread portion length, number of and screw pitch of thread ridges as the female thread portions 9b.

A concave-hole forming portion and a concave-groove forming groove (depiction of both of which is omitted), which are substantially shell-shaped or substantially semi-circular, are protrusively provided on both sides of the thread forming portion 31 to enable forming the concave hole 20b and the recessed grooves 21b. In the figure, the reference numerals 33, 34 denote concave and convex portions formed on the lower surface of the upper metallic die 29 to enable forming the concave and convex portions 24, 25.

On the other hand, a concave groove 35 having a substantially semi-circular cross section is formed centrally of an upper surface of the lower metallic die 30, both sides of the groove 35 in a longitudinal direction being closed.

Figure 14C:
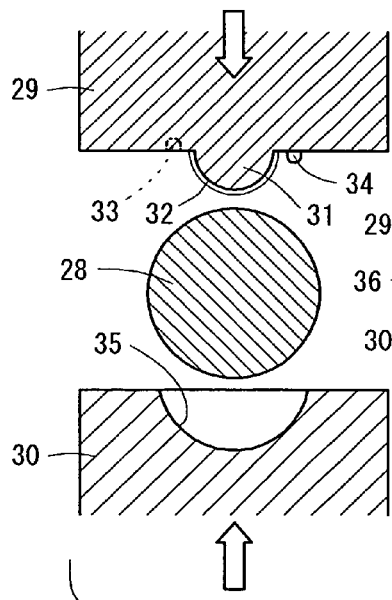
Figure 14D:
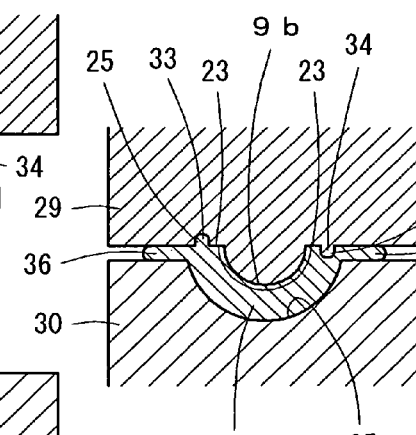

The forming raw material 28 as heated is received in the concave groove 35 of the metallic die 30, the metallic dies 29, 30 are moved to approach each other as shown in FIG. 14(c) to push the forming raw material 28 into the concave groove 35, and the concave-hole forming portion, the concave-groove forming groove (depiction of both of which is omitted), and the thread forming portion 31 are pushed from above to form the concave hole 20b, the recessed groove 21b, and the female thread portions 9b on an inner, peripheral surface thereof. FIG. 14(d) shows such situation.

Forming by means of the metallic dies 29, 30 causes a burr 36 to project from both sides therebetween, an upper surface of the burr 36 is formed flat by the metallic dies 29, 30, and the concave and convex portions 24, 25 are formed on the joint surfaces 23, 23 on a base side of the upper surface.

Figure 14E:
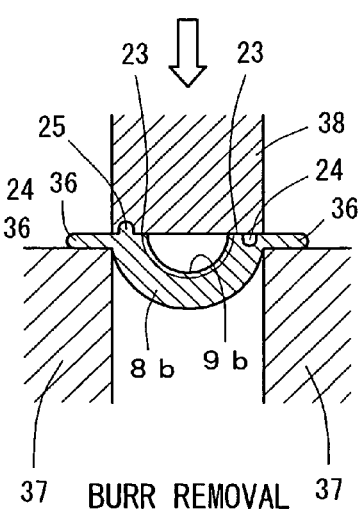

After such forming, before the connecting piece 8b is cooled, it is moved to a metallic die 37 of a burr removal machine as shown in FIG. 14(e) and the burr 36 projecting on both sides is punched by a punch 38 to be removed, so that forming of the connecting piece 8b is terminated.

In addition, while forming of the connecting piece 8a is substantially the same as forming of the connecting piece 8b, upper and lower metallic dies are fundamentarily manufactured separately from the connecting piece 8b.

The upper metallic die is formed such that a lead angle of the thread portion of the thread forming portion is opposite to that of the male thread portion 32 and a thread position thereof is offset by 180° in phase and gains substantially half a pitch relative to the male thread portion 32. Also, the lower metallic die is the same in structure except that the concave groove 35 is formed at a bottom thereof with a flat portion, on which the positioning portion 19 is formed.

Figure 14F:
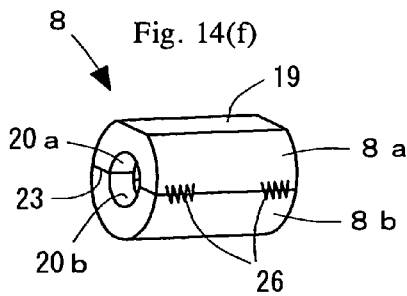

In this manner, after the pair of the connecting pieces 8a, 8b are manufactured, manufacture of the connecting member 8 is completed by having the connecting pieces facing each other, fitting the concave and convex portions 24, 25 together, joining the joint surfaces 22, 23, performing welding 26 in a plurality of locations on an outer periphery of the joined portion, and connecting the connecting pieces 8a, 8b integrally. FIG. 14(f) shows this state.

Figure 7:
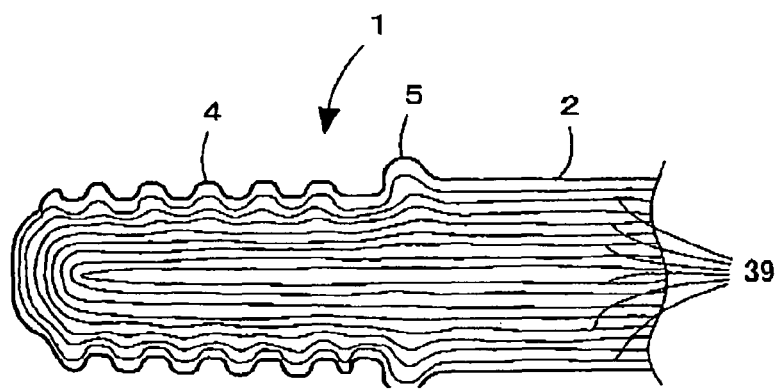
FIG. 7 is a cross sectional view showing, in enlarged scale, grain flows around the male thread portion of the traction hook.

Further, the reference numeral 39 in FIG. 7 denotes grain flows formed over the shaped shank 2, the male thread portion 4, and the flange portion 5 in the traction hook 1 in a layered manner without fragmentation.

In manufacturing the traction hook 1 of the invention thus structured, carbon steel, chromium-molybdenum steel, etc. which constitutes the forming raw material 10 and has a predetermined dimension, is prepared and cut to a predetermined dimension as shown in FIG. 8(a).

Figure 9:
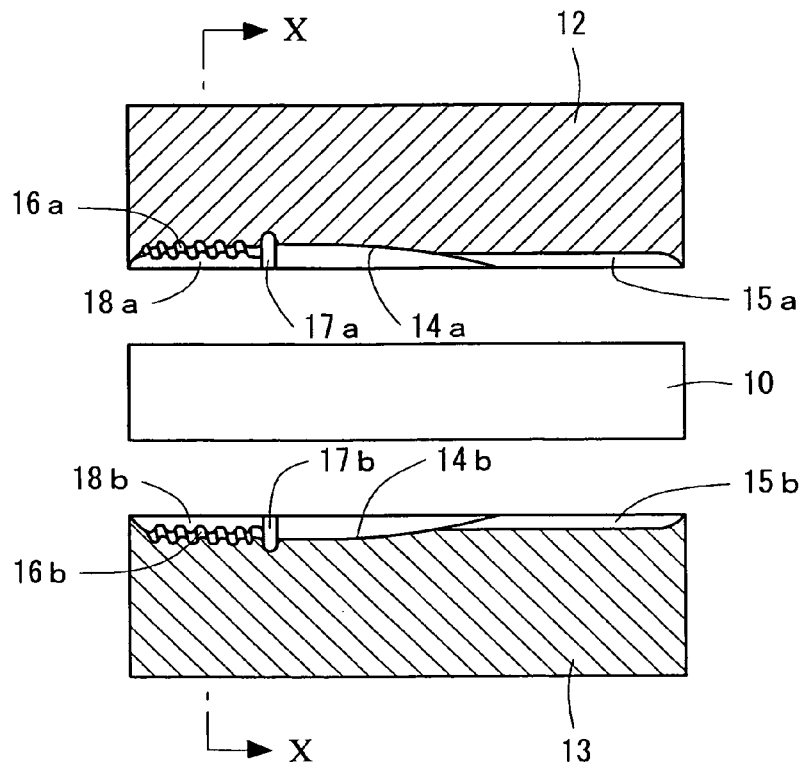
FIG. 9 is a cross sectional view showing a pair of metallic dies applied to forged forming of the traction hook.
Figure 10:
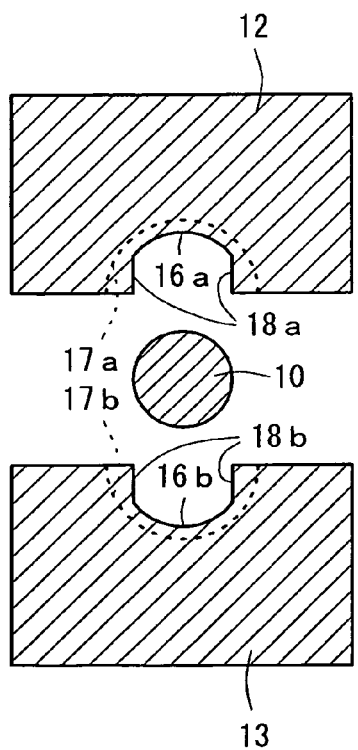
FIG. 10 is a cross sectional view taken along the line X-X in FIG. 9.
Figure 1:
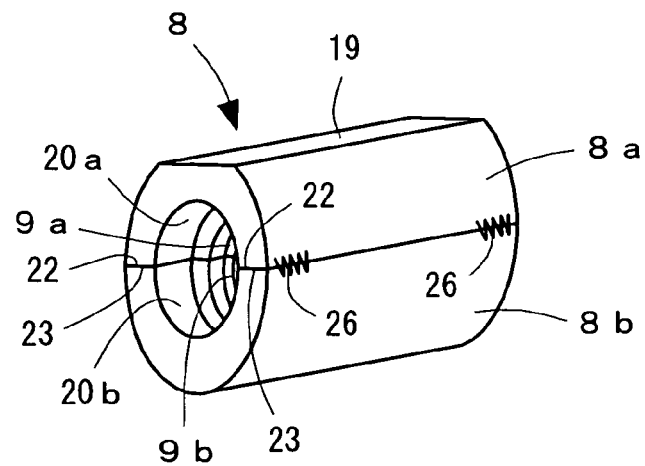
Figure 1:
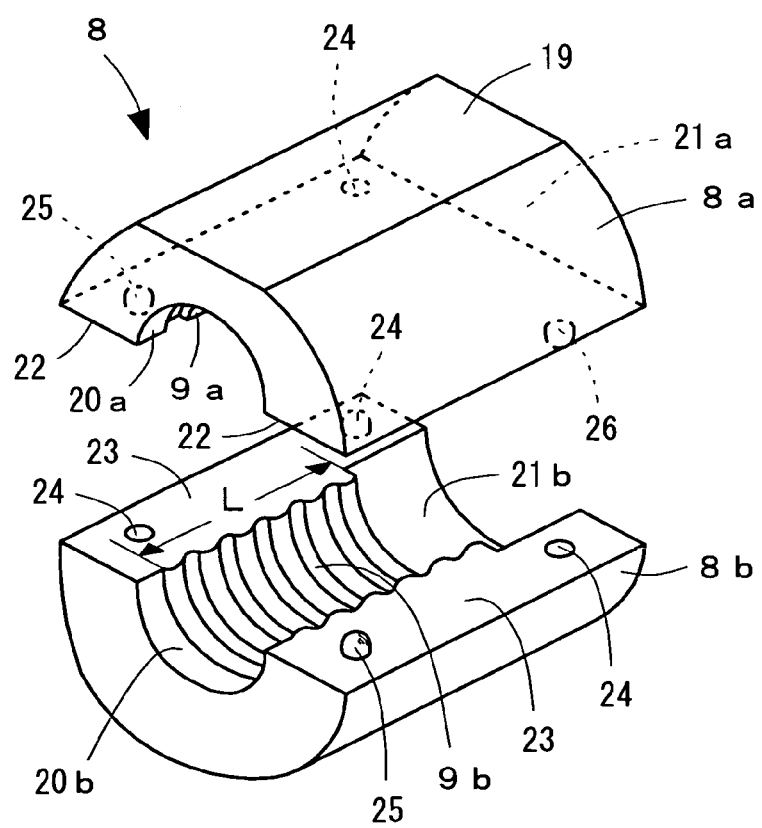
Figure 13:
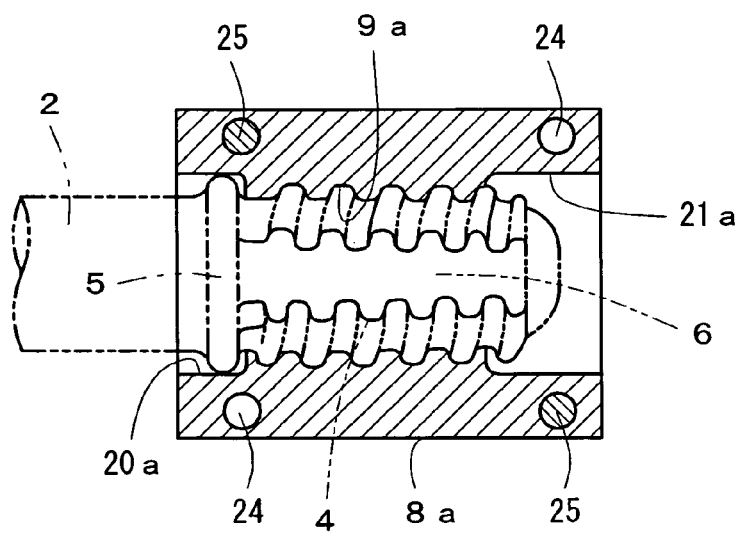
FIG. 13 is a cross sectional view showing, in enlarged scale, the connecting member of FIG. 11 in a state, in which the connecting pieces are connected.

The forming raw material 10 is heated to about 1200° C. to 1400° C. as shown in FIG. 8(b) and moved between the metallic dies 12, 13 of a forging machine (depiction of which is omitted) as shown in FIGS. 9 and 10, and the whole traction hook 1 including the male thread portion 4, the side cut portions 6, and the hook portion 3 is subjected through the metallic dies 12, 13 to high-temperature hot forging at a time as shown in FIG. 8(c).

After this, a burr 11 projecting circumferentially due to the forming is cut by a cutter (depiction of which is omitted), the traction hook 1 shown in FIG. 8(d) is then obtained, a circumferential surface thereof is plated or coated, and then a series of manufacturing processes of the traction hook 1 are completed.

In this manner, the whole traction hook 1 of the invention including the male thread portion 4 is subjected to forged forming, so that it is possible to omit complex and accurate pre-working of the male thread portion 4 and working of the threads by machining or rolling or the like as in the related art, and so manufacture can be correspondingly performed readily and rapidly.

Besides, the male thread portion 4 is formed uniformly by the metallic dies 12, 13 and the original position Ss and the terminal position Se of the thread ridges are uniformly and accurately formed coaxially with the hook forming grooves 15a, 15b and at a forward end of the male-thread forming groove 16a or at a rear end of the male-thread forming groove 16b, so that the male thread portion 4 can be formed with a screwed position and a clamped position being predetermined.

Also, since forming is accomplished by moving the metallic dies 12, 13 in a direction perpendicular to the forming raw material 10, it is possible to make forging small in capacity and size and achieve reduction in installation cost as compared with the related art, in which metallic dies are moved in an axial direction of the forming raw material 10 to perform forging.

Further, as compared with an arrangement, in which metallic dies are moved from both sides of the forming raw material 10 to approach the same, the original position Ss and the terminal position Se of the thread ridges can be formed to be predetermined in relative positions to associated constituent portions such as the hook portion 3, etc.

Subsequently, in the case where the connecting member 8 of the invention is to be manufactured, the connecting pieces 8a, 8b obtained by dividing the connecting member into substantially two halves are separately subjected to forged forming and the pair are joined to accomplish manufacture. FIG. 14 shows a procedure of manufacture.

In this case, since methods of manufacturing the connecting pieces 8a, 8b are substantially the same, an explanation will be first given to manufacture of one 8b of the connecting pieces.

That is, with the connecting piece 8b, a round bar shaped forming raw material 28 is cut to a predetermined dimension as shown in FIG. 14(a), heated to about 1200° C. to 1400° C. as shown in FIG. 14(b), and is subjected to high-temperature hot forging at a time together with the female thread portions 9b by a forging machine (depiction of which is omitted).

Metallic dies 29, 30 are arranged up and down in opposition to each other on a forging machine (depiction of which is omitted), a substantially semi-circular or shell-shaped thread forming portion 31 is protrusively provided centrally of a lower surface of the upper metallic die 29, and a concave-hole forming portion and a concave-groove forming groove (depiction of both of which is omitted), which are substantially shell-shaped or substantially semi-circular, are protrusively provided on both sides of the thread forming portion 31.

A male thread portion 32 capable of forming the female thread portion 9b is machined on an arcuate, peripheral surface of the thread forming portion 31, and the male thread portion 32 is formed to be substantially the same in thread portion length, number of and screw pitch of thread ridges as the female thread portion 9b.

On the other hand, a concave groove 35 having a substantially semi-circular cross section is formed centrally of an upper surface of the lower metallic die 30, both sides of the groove 35 in a longitudinal direction being closed.

In such forging machine (depiction of which is omitted), the forming raw material 28 as heated is received in the concave groove 35 of the metallic die 30, the metallic dies 29, 30 are moved to approach each other as shown in FIG. 14(c) to push the forming raw material 28 into the concave groove 35 to form the same in a substantially shell-shaped configuration.

The concave-hole forming portion, the concave-groove forming groove (depiction of both of which is omitted), and the thread forming portion 31 are pushed from above the forming raw material 28 to form the concave hole 20b, the recessed grooves 21b, and the female thread portion 9b on an inner, peripheral surface thereof. FIG. 14(d) shows such situation.

Forming by means of the metallic dies 29, 30 causes a burr 36 to project from both sides between the metallic dies 29, 30, an upper surface of the burr 36 is formed flat by the metallic dies 29, 30, and concave and convex portions 24, 25 are formed on the joint surfaces 23, 23 on a base side.

After the forming, before the connecting piece 8b is cooled, it is moved to a metallic die 37 of a burr removal machine as shown in FIG. 14(e) and the burr 36 projecting on both sides is punched by a punch 38 to be removed.

In this manner, forming of the connecting piece 8b is terminated.

In addition, while forming of the connecting piece 8a is substantially the same as forming of the connecting piece 8b, upper and lower metallic dies are fundamentarily manufactured separately from the connecting piece 8b.

The upper metallic die is formed such that a lead angle of the thread portion of the thread forming portion is opposite to that of the male thread portion 32 and a thread position thereof is offset by 180° in phase and gains substantially half a pitch relative to the male thread portion 32. In addition, the lower metallic die is the same in structure except that the concave groove 35 is formed at a bottom thereof with a flat portion, on which the positioning portion 19 is formed.

In this manner, after the pair of the connecting pieces 8a, 8b are manufactured, manufacture of the connecting member 8 is completed by having the connecting pieces facing each other to fit the concave and convex portions 24, 25 together, joining the joint surfaces 22, 23, performing welding 26 in a plurality of locations on an outer periphery of the joined portion, and connecting the connecting pieces 8a, 8b integrally. FIG. 14(f) shows this state.

In this case, since the concave and convex portions 24, 25 are formed simultaneously with forming of the female thread portions 9a, 9b, the connecting pieces 8a, 8b are accurately and surely connected together, thread ridges of the female thread portions 9a, 9b are caused to accurately and surely agree with each other, and smooth and continuous thread ridges are obtained.

In this manner, with the connecting member 8 of the invention, since the pair of the connecting pieces 8a, 8b are subjected to forged forming and connected integrally to be manufactured, the female thread portions 9a, 9b can be surely formed and the male thread portion can be smoothly and readily screwed thereinto as compared with a conventional forming method, in which a core formed with male threads is inserted into a hole of a single forming raw material and upper and lower dies push the raw material from outside to accomplish forged forming of female threads on an inner surface of the raw material.

As shown in FIGS. 1, 2, 4, and 5, with the traction hook 1 thus manufactured, the male thread portion 4 being trapezoidal threads and the hook portion 3 being substantially the same in shape as conventional ones are arranged at both ends of the shaped shank 2, the flange portion 5 having a larger diameter than that of the male thread portion 4 is protrusively provided on a whole periphery of a boundary of the shaped shank 2 and the male thread portions 4, and these elements are subjected integrally to forged forming, so that the male thread portion 4 is increased in strength and a stiff strength is obtained as a whole.

As shown in FIG. 7, the grain flows of the traction hook 1 are formed over a whole region, which includes the trapezoidal thread portions and the flange portion 5, in a layered manner without fragmentation to provide for a great strength against a repeated bending stress.

With the embodiment, the male thread portion 4 includes trapezoidal threads with about six thread ridges and is formed such that the trapezoidal threads are arranged at a large pitch to be formed at a tip end thereof with the original position Ss, in which the thread ridges originate, and to be formed at a rear end thereof with the terminal position Se, in which the thread ridges terminate, and the thread portion length L defined between the original position Ss and the terminal position Se is substantially the same as the length L of the female thread portion 9 of the connecting member 8.

The original position Ss and the terminal position Se are set so that when the male thread portion 4 is screwed into the female thread portion 9 of the connecting member 8 to be clamped, the hook portion 3 is positioned at the allowable angle θ shown in FIG. 15.

That is, the allowable angle θ is in the range of such an allowable angle that the hook portion 3 is turned by a bending moment or vibrations generated by the wire rope W set thereon in a direction, in which the male thread portion 4 is clamped, so that safety of the hook portion 3 in use is accordingly ensured to inhibit the male thread portion 4 from being made loose.

With the embodiment, the hook portion 3 is directed obliquely downward as shown in FIG. 15 and set at substantially 120° and 150° in a clockwise direction with a vertical line as a reference, imaginary lines shown in the figure indicate the hook portion 3 in both positions at substantially 120° and 150°, and an allowable angle θ is set to about 50°, in which range the original position Ss and the terminal position Se are defined.

In this case, while the wire rope W is stretched on the hook portion 3, set in the position, in the range of an angle δ shown in FIG. 15, a bending moment generated by the wire rope W acts in a direction, in which the male thread portions 4 is clamped, in the range of an angle δ, so that safety is ensured.

On the other hand, the connecting member 8 thus manufactured gets a stiff strength since the pair of the connecting pieces 8a, 8b are subjected to forged forming and connected integrally to be manufactured.

Besides, since the connecting pieces 8a, 8b are in no way machined, grain flows are formed over a whole region, which includes the female thread portions 9a, 9b, the recessed grooves 20a, 20b, the recessed grooves 21a, 21b, and the concave and convex portions 24, 25, in a layered manner without fragmentation to provide for a great strength against a repeated bending stress.

In this manner, in the case where the traction hook 1 thus manufactured and the connecting member 8 are used, the connecting member 8 is first mounted to forward and rear ends of an automobile, that is, the body frame 7 around a bumper in the embodiment.

At this time, the connecting member 8 is inserted into the mount hole 7a, which is the same in cross sectional shape as that of the connecting member 8 provided on the body frame 7, with the positioning portion 19 directed upward and the concave hole 20 directed outward.

Figure 3:
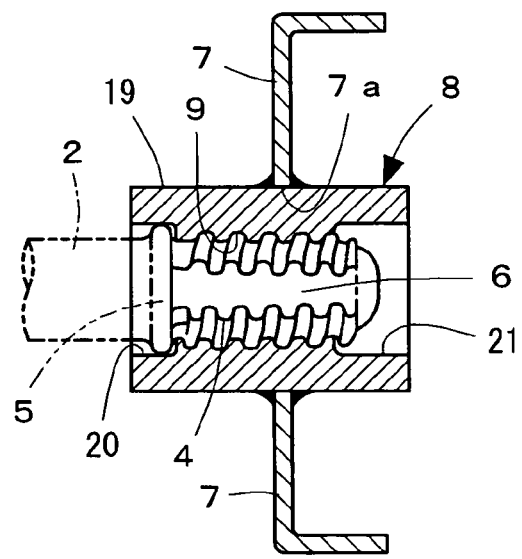
FIG. 3 is a cross sectional view showing a connecting member, to which the invention is applied, and a state, in which the connecting member is mounted to a body frame.

When this is done, the connecting member 8 is locked in turning and exactly mounted, and the connecting member 8 is maintained in horizontal posture to be mounted to the body frame 7 by welding. FIG. 3 shows such situation.

After the connecting member 8 is thus mounted, an associated automobile is shipped onto a ship and moored in a predetermined position.

In this case, the traction hook 1 is held, a side of the male thread portion 4 is inserted into the concave hole 20 of the connecting member 8 and the male thread portion 4 is screwed into the female thread portion 9 of the connecting member 8 to be clamped. FIG. 3 shows such situation.

When this is done, the male thread portion 4 is screwed into the female thread portion 9 in the original position Ss to move deep into the female thread portion 9 to be clamped when the terminal position Se is moved to a terminal end of the thread portion length L of the female thread portion 9, and mounted with the shaped shank 2 and the hook portion 3 projecting outside the body frame 7.

The flange portion 5 is moved deep into the concave hole 20, so that its peripheral surface is positioned to be engageable with an inner surface of the concave hole 20 and the hook portion 3 is positioned at the predetermined, allowable angle θ shown in FIG. 15.

At this time, since the side cut portions 6 are formed on both peripheral surfaces of the male thread portion 4 of the traction hook 1 and advance through the female thread portion 9 of the connecting member 8, they scrape out sand, dust, etc., which possibly adheres to the female thread portion 9, so that the male thread portion 4 is prevented from galling and smoothly screwed.

This is advantageous in the case where the connecting member 8 is mounted to the body frame 7, to which sand, dust, etc. are liable to adhere, and even when sand, dust, etc. adhere to the female thread portion 9 in the event of appropriately mounting the traction hook 1, generation of the galling is inhibited and smooth mounting is accomplished since the male thread portion 4 and the female thread portion 9, which screw together, are large in diameter and in screw pitch.

Since the original position Ss and the terminal position Se are defined uniformly in a predetermined manner by forged forming of the male thread portion 4, a position, in which the hook portion 3 is mounted, is maintained to be fixed irrespective of a combination of the traction hook 1 and the connecting member 8 and so all the hook portions 3 are mounted at the angle θ.

Figure 30:
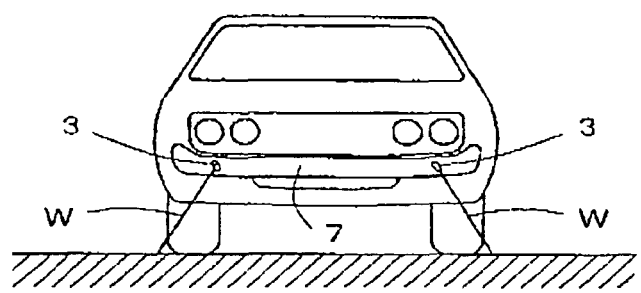
FIG. 30 is an illustration of the use of the traction hook and traction member according to the invention for stabilizing a vehicle to a level surface.

Thereafter, as shown in FIG. 30. one end of the wire rope W is set on the hook portion 3, the other end thereof is set on a mooring hook (depiction of which is omitted) on a side of a ship, an intermediate portion thereof is tensioned at a predetermined tension by a winch (depiction of which is omitted), and then the work of mooring an automobile is terminated.

In this case, while the wire rope W is set on the hook portion 3 in the range of the angle δ shown in FIG. 15, the hook portion 3 is uniformly mounted at the angle θ shown in FIG. 15 as described above, so that the work of setting the wire rope W can be smoothly and efficiently done as compared with conventional ones, in which setting and mounting are various.

The automobile thus moored moves accompanying a complex behavior of a ship at the time of navigation and the hook portion 3 of the traction hook 1 is acted by a bending moment or vibrations generated by the wire rope W, which acts on the male thread portion 4 and the female thread portion 9.

With a position, in which the hook portion 3 is mounted, however, since a bending moment or vibration generated by the wire rope W acts in a clockwise direction, that is, in a direction, in which the threads are clamped, the bending moment or vibrations do not make the male thread portion 4 and the female thread portion 9 loose, so that safety in mooring is preserved to enable safe shipping of an automobile.

In this case, while the wire rope W is set in the range of the angle δ shown in FIG. 15 as described above, a bending moment generated on the hook portion 3 is directed uniformly within the angle δ to act in a direction, in which the male thread portion 4 is clamped, so that generation of looseness is prevented and safety in mooring is preserved.

Therefore, it is possible to eliminate a conventional disadvantage that in anticipation of generation of looseness in the male thread portion 4 and the female thread portion 9, such portions and threads are increased in diameter to be reinforced and the traction hook 1 is correspondingly increased in size and weight.

Also, since the peripheral surface of the flange portion 5 is positioned to be engageable with the inner surface of the concave hole 20, rolling of the shaped shank 2 or the hook portion 3 is prevented to prevent an automobile from following such movement, thus enabling achieving a stable state of mooring.

FIG. 16 shows a configuration of application of a connecting member 8, to which the invention is applied, and the same reference numerals are used to denote portions corresponding to those in the structure as described above.

Figure 16A:
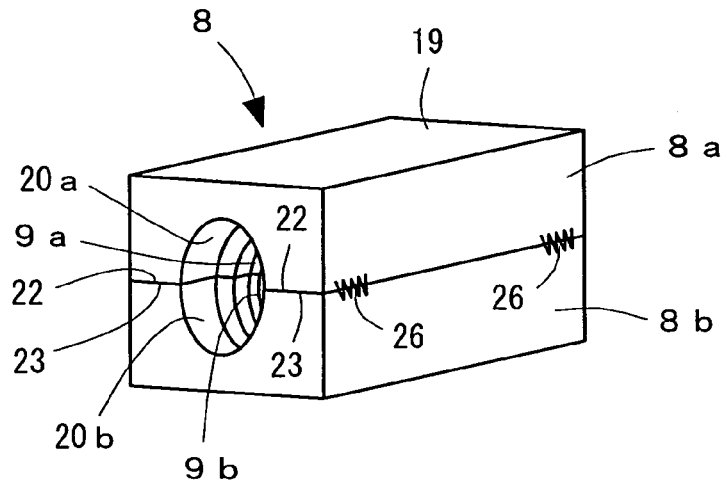
FIGS. 16(a) to 16(c) are perspective views showing a configuration of application of a connecting member, to which the invention is applied.

In FIG. 16(a), a connecting member 8 is formed to be rectangular-shaped, respective connecting pieces 8a, 8b are formed to assume a split-shaped rectangular parallelopiped to be made easy in positioning relative to a mount hole 7a, and a positioning portion 19 of one 8a of the connecting pieces is formed to define a wide, flat surface.

Figure 16B:
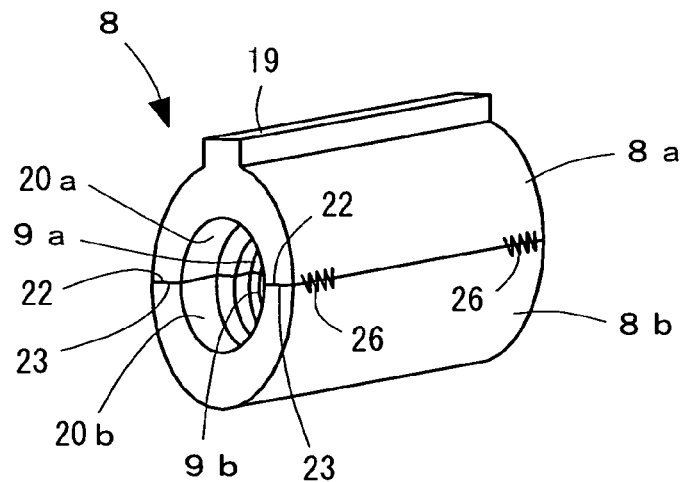
Figure 16C:
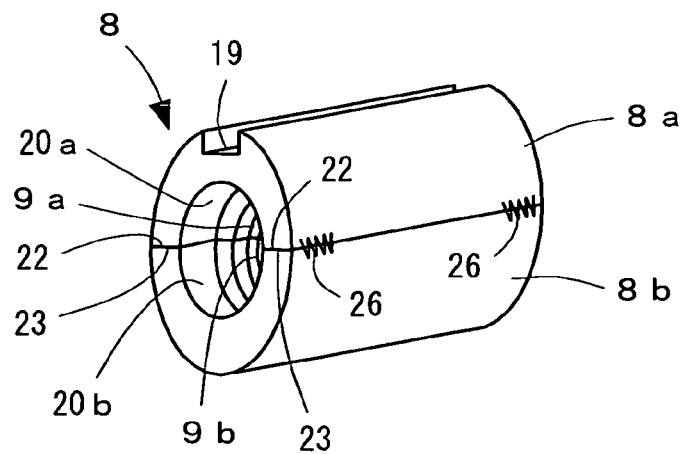
Figure 17:
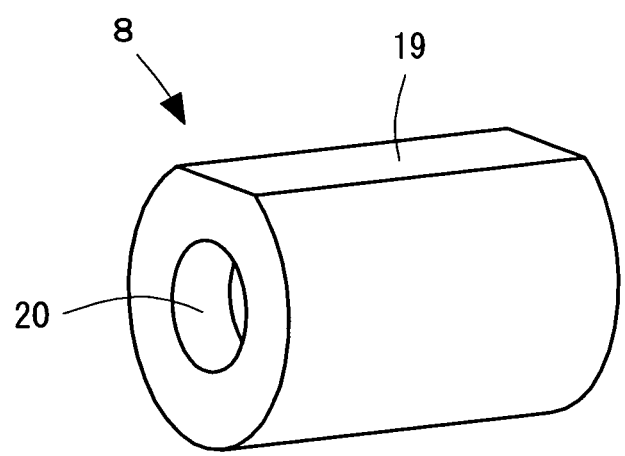
FIG. 17 is a perspective view showing a further embodiment of a connecting member, to which the invention is applied and which is made of a single forming raw material.

In FIGS. 16(b) and 16(c), a connecting member 8 is formed to be substantially the same in shape as that of the embodiment shown in FIG. 11, and a positioning portion 19 of one 8a of the connecting pieces is formed to assume a rib-shaped projection or a concave groove to correspond to a shape of a mount hole 7a.

FIGS. 17 to 29 show other embodiments of the invention, and the same reference numerals are used to denote portions corresponding to those in the structure as described above.

FIGS. 17 to 22 show a second embodiment of the invention, the embodiment showing a connecting member 8 being a single member subjected to forged forming at a time instead of dividing a connecting member 8 into two members as described above to subject the same to forged forming to connect the same together, and a method of manufacturing the same.

The connecting member 8 is manufactured by forged forming of carbon steel, chromium-molybdenum steel, etc., which constitutes a forming raw material 10, and FIG. 18 shows a procedure of manufacture.

Figure 18A:
FIG. 18 is a view illustrating a procedure of manufacture of the connecting member of FIG. 17, FIG. 18(a) being a perspective view showing a situation after a forming raw material is cut, FIG. 18(b) being a perspective view showing a situation of heating of the forming raw material thus cut, FIG. 18(c) being a cross sectional view showing a situation at the time of forging forming, FIG. 18(d) being a cross sectional view showing a situation, in which a core shaft is pulled out after forging forming, FIG. 18(e) being a cross sectional view showing a situation, in which a burr is removed after the core shaft is pulled out, and FIG. 18(f) being a view showing a situation, in which manufacture of a connecting member is completed.
Figure 18B:
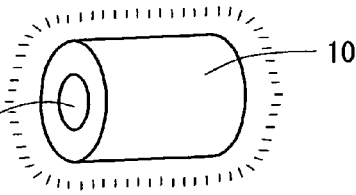
Figure 18C:
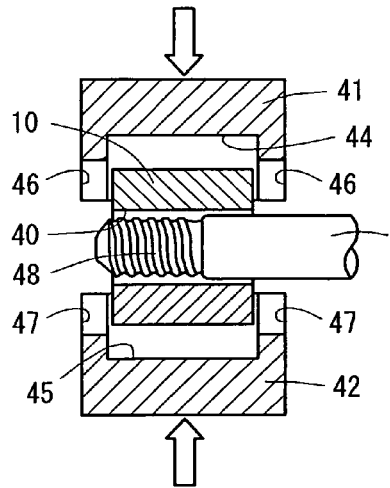

That is, the forming raw material 10 being made of carbon steel, chromium-molybdenum steel, etc. is subjected to, for example, boring to be formed with a through-hole 40 of a large diameter as shown in FIG. 18(a) and heated to about 1200° C. to 1400° C. as shown in FIG. 18(b) to be received between a pair of metallic dies 41, 42 of a forging machine (depiction of which is omitted) and a core shaft 43 is inserted into the through-hole 40 to be subjected to high-temperature hot forging at a time as shown in FIG. 18(c).

The metallic dies 41, 42 are provided inside with concave grooves 44, 45 capable of forming the forming raw material 10 and provided on both sides thereof with recesses 46, 47, through which the core shaft 43 can be inserted and removed, the grooves and the recesses being arranged to enable approaching and separating.

The core shaft 43 is made of a round bar shaped steel material having a higher hardness than that of the forming raw material 10 and formed on a whole circumference of a tip end thereof with a male thread portion 48, which is substantially the same as the male thread portion 4, and the male thread portion 48 is arranged in a predetermined position on the forming raw material 10 to correspond to a position of the female thread portion 9.

The male thread portion 48 is machined to be substantially the same in thread portion length L, and number and screw pitch of thread ridges as the male thread portion 4 and the female thread portion 9.

At this time, an appropriate release agent such as ceramic powder, etc. is coated on the thread portion of the core shaft 43 and a periphery thereof to prevent seizure thereof and to enable smoothly pulling out the core shaft 43 after forming.

Figure 18D:
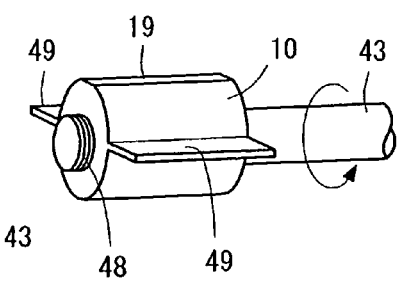
Figure 18E:
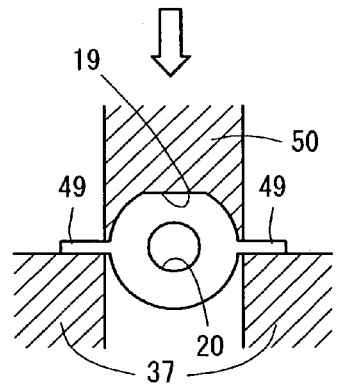

After forming, a burr 49 projecting around the forming raw material 10 is pushed by appropriate means to be locked in turning and the core shaft 43 is turned and pulled out of the female threads as shown in FIG. 18(d).

Figure 18F:
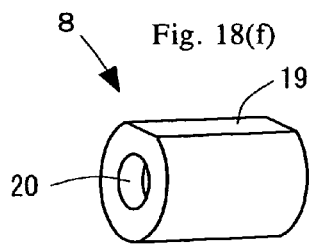
Figure 19:
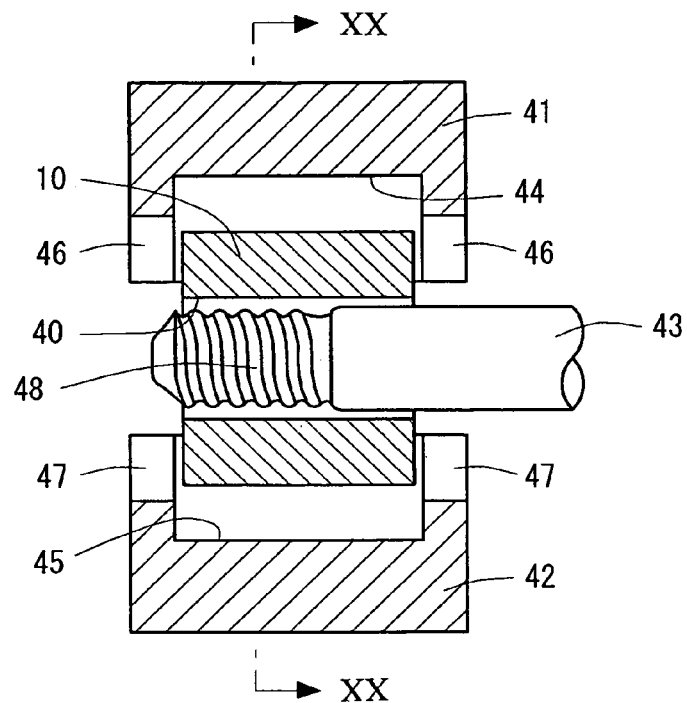
FIG. 19 is a cross sectional view showing, in enlarged scale, a situation at the time of forging forming of a connecting member of FIG. 17.
Figure 20:
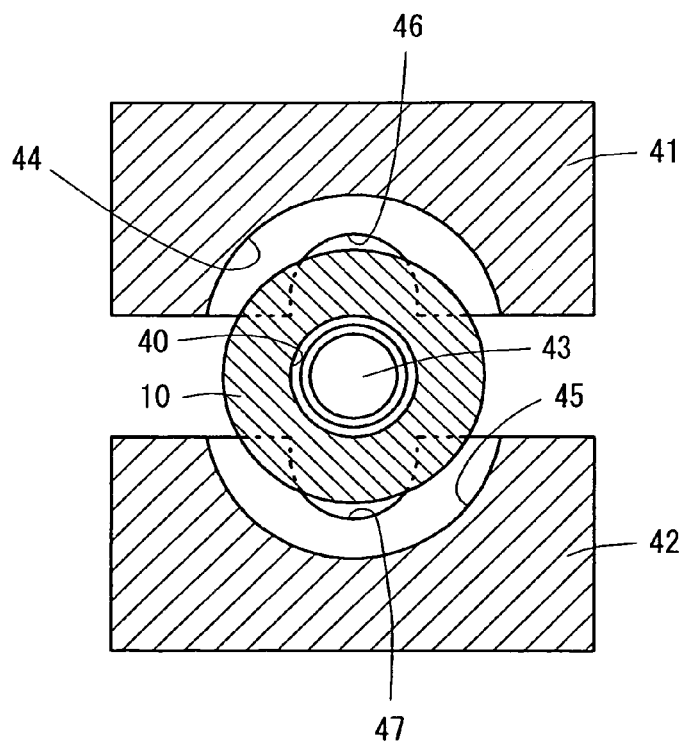
FIG. 20 is a cross sectional view, in a little enlarged scale, taken along the line XX-XX in FIG. 19.
Figure 21:
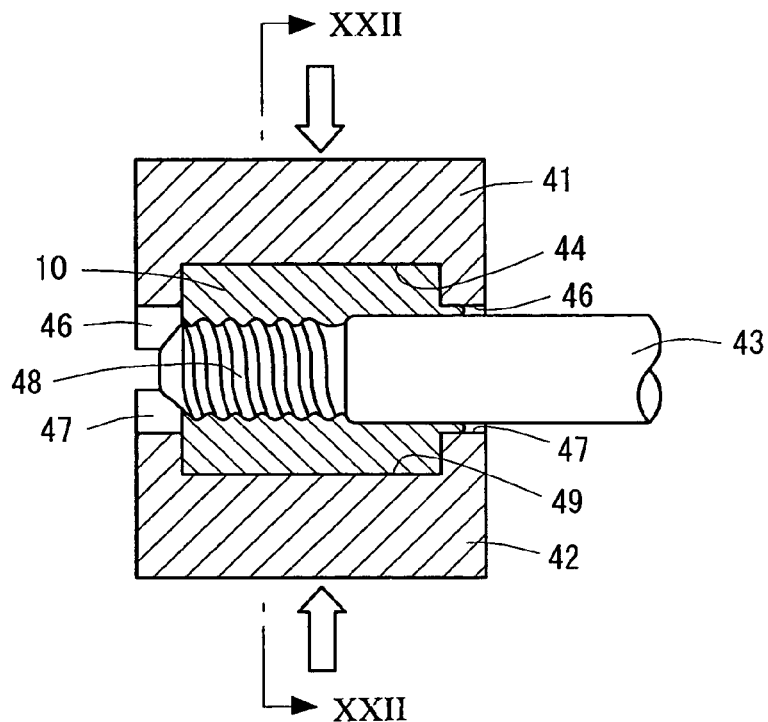
FIG. 21 is a cross sectional view showing, in enlarged scale, a situation after forging forming of the connecting member of FIG. 17.
Figure 22:
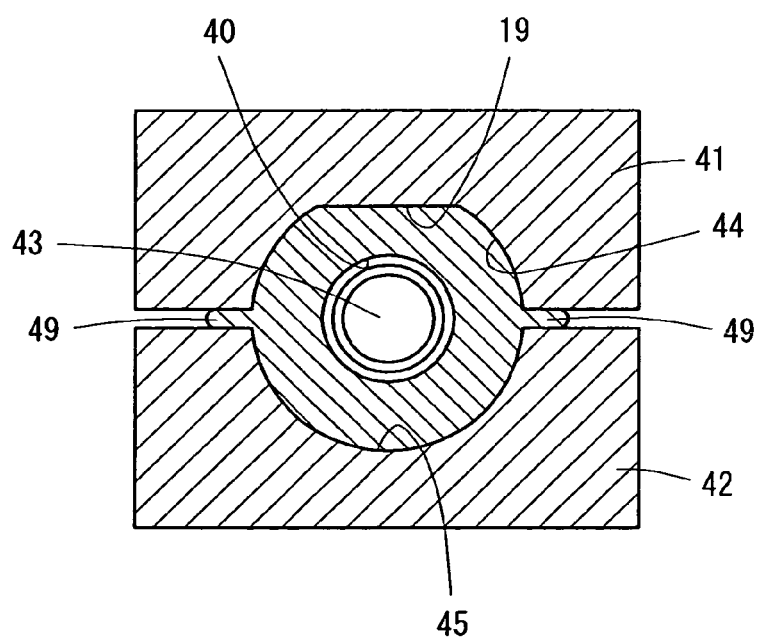
FIG. 22 is a cross sectional view, in a little enlarged scale, taken along the line XXII-XXII in FIG. 21.

Thereafter, the forming raw material 10 is accommodated in a metallic die 37 of a burr removal machine and punched by a punch 50 to remove the burr 49, so that forming of the connecting member 8 is completed as shown in FIG. 18(f).

Accordingly, it is possible to omit the work of forged-forming the two connecting pieces 8a, 8b together with the concave and convex portions 24, 25 to weld the same for connection in the embodiment described above, thus enabling performing manufacture readily and rapidly.

Figure 23:
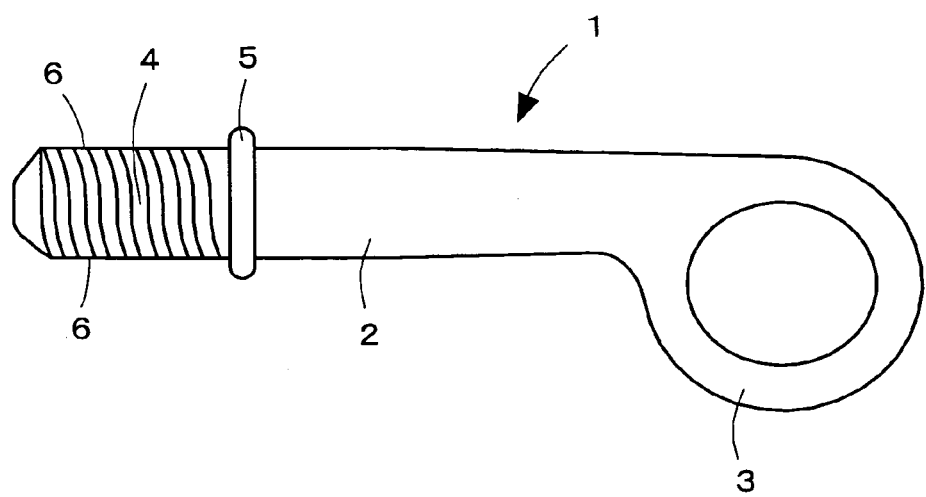
FIG. 23 is a front view showing a third embodiment of a traction hook, to which the invention is applied.
Figure 24:
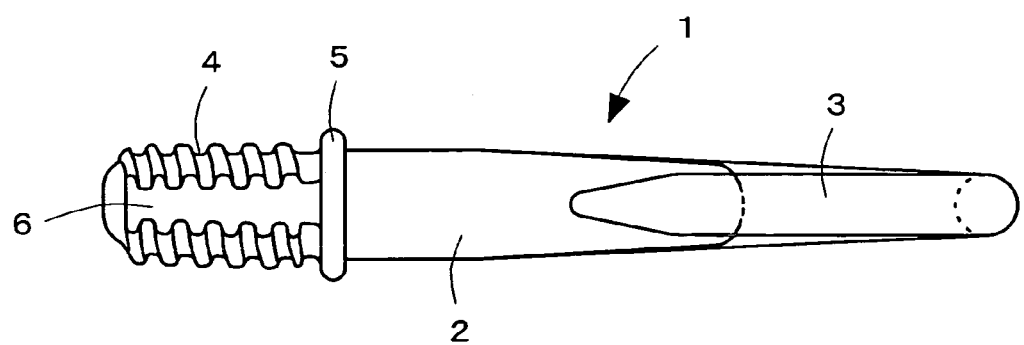
FIG. 24 is a front view showing a further configuration of the third embodiment of the traction hook, to which the invention is applied.

FIGS. 23 and 24 show a third embodiment of a traction hook 1, FIG. 23 showing an annular hook portion 3 formed to be offset from a center of a shank portion 2, and FIG. 24 showing a hook portion 3 formed to be offset from the center of the shank portion 2 and opened at a tip end thereof to enable mounting and dismounting of a wire rope.

Even when the hook portion 3 is formed to be offset from the center of the shank portion 2, traction and mooring are increased in safety provided that the traction hook 1 is mounted in a predetermined position shown in FIG. 15, since a bending moment or vibrations generated by the wire rope acts in a clockwise direction, that is, in a direction, in which the threads are clamped, and besides the bending moment is increased corresponding to the offset to promote the action in the thread clamping direction.

Figure 25:
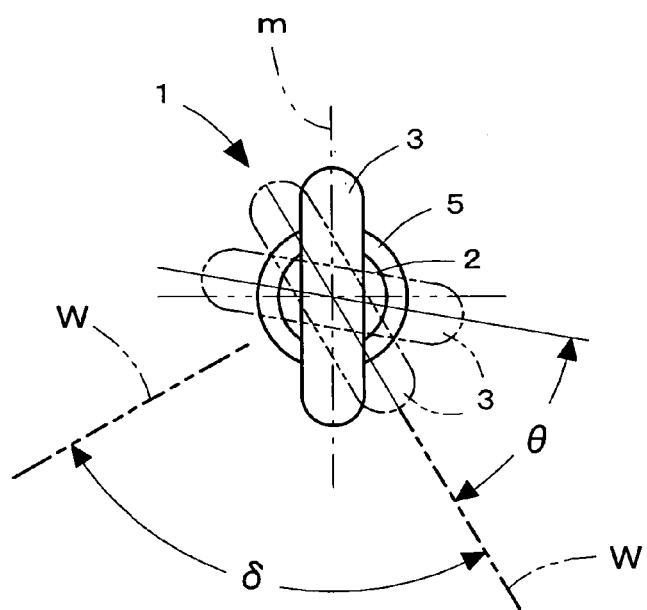
FIG. 25 is a side view showing a further configuration of a position, in which a hook portion is mounted when a traction hook according to the invention is clamped.

FIG. 25 shows a further configuration of a position, in which the hook portion 3 is mounted, when the traction hook 1 of the invention is clamped. That is, when the traction hook 1 is clamped to the connecting member 8 to be used, the hook portion 3 is set in position and orientation to be directed further obliquely downward than the hook portion 3 shown in FIG. 15 is, and to be positioned in a most downward position at 150° in the range of substantially 100° to 150° in a clockwise direction to a straight line m in parallel to a flat surface of the hook portion 3, of which an allowable angle θ is set in the range of substantially 50° in the same manner as in FIG. 15, and an original position Ss and a terminal position Se of the male thread portion 4 are designed correspondingly.

Also, in this case, while the wire rope W is stretched on the hook portion 3, set in the position, in the range of an angle δ shown in FIG. 25, a bending moment generated by the wire rope W acts in a direction, in which the male thread portion 4 is clamped, in the range of an angle δ, so that safety is ensured.

Figure 26:
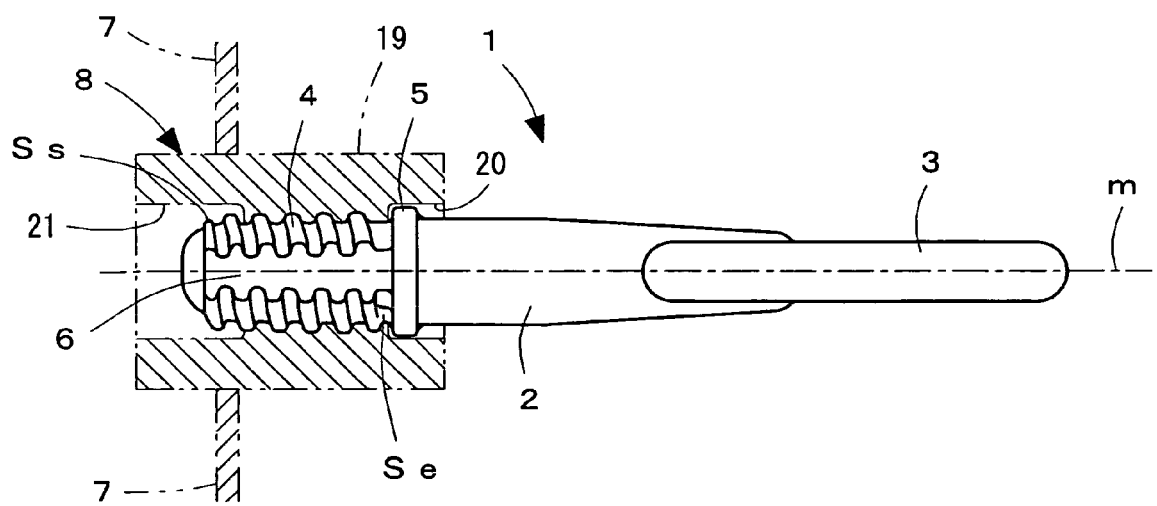
FIG. 26 is a front view showing a fourth embodiment of a traction hook, to which the invention is applied.

FIG. 26 shows a fourth embodiment of a traction hook 1, in which embodiment a single flange portion 5 protrusively provided on a shank 2 is formed to be substantially trapezoidal or rectangular in cross section, instead of a substantially semi-circular cross section as in the embodiment described above, to ensure a wide area of an engaging surface with a concave hole 20, whereby stability of the traction hook 1 or the flange portion 5 relative to the concave hole 20 is improved to improve mooring in safety.

The flange portion 5 is formed in the manufacturing process of the traction hook in the embodiment described above by accommodating a flange portion 5, which is substantially semi-circular in cross section, in a forming metallic die (depiction of which is omitted) when the flange portion 5 is cooled to a substantially ordinary temperature after burr removal subsequent to forged forming, subjecting an upper portion or a top portion of the semi-circular cross section to coining forming in a forming metallic die (depiction of which is omitted), and forming the upper portion or the top portion to make the same flat. In this manner, without the need of reheating, an accurate coining forming can be performed by coining forming of the flange portion 5 at the time of cooling.

Figure 27:
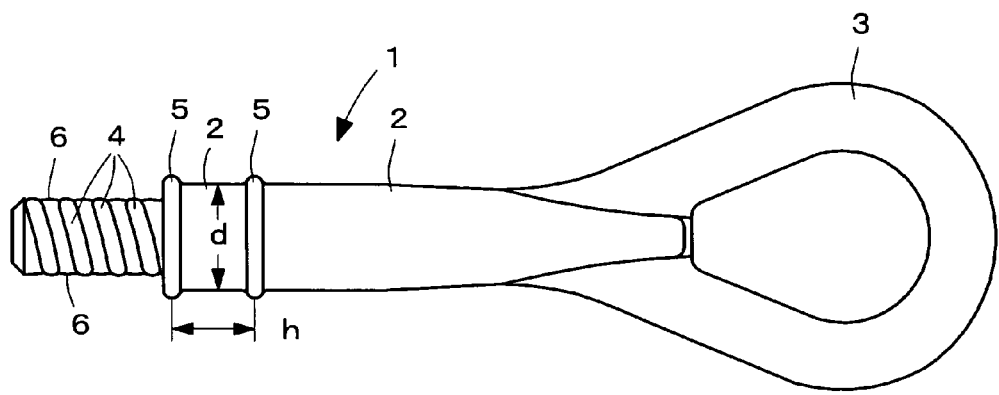
FIG. 27 is a front view showing a fifth embodiment of a traction hook, to which the invention is applied.
Figure 28:
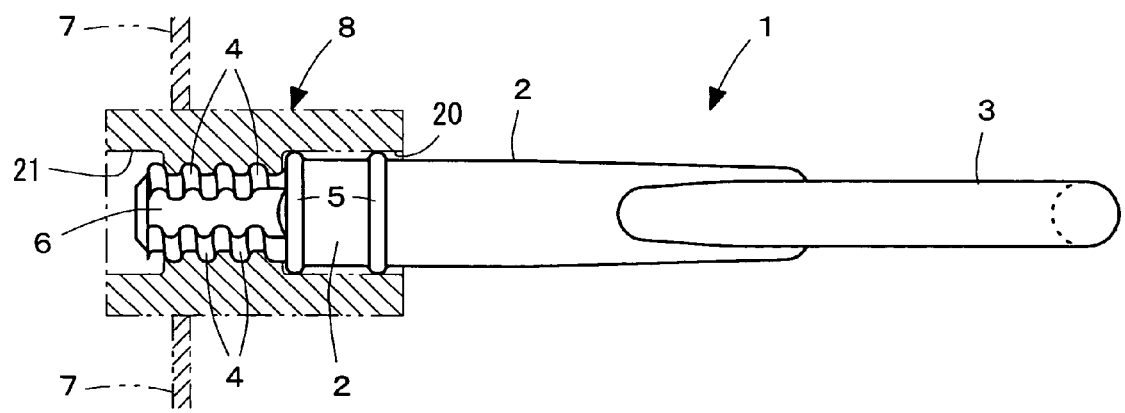
FIG. 28 is a side view of FIG. 27.
Figure 29:
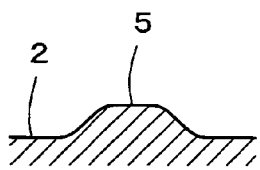
FIG. 29 is a cross sectional view showing, in enlarged scale, a flange portion in FIG. 27.

FIGS. 27 to 29 show a fifth embodiment of a traction hook 1, in which embodiment a plurality of flange portions 5 are protrusively provided at predetermined intervals instead of protrusively providing a single flange portion 5 on a shank 2.

The plurality of flange portions 5 are the same in a forming method and timing of forming as the fourth embodiment.

The flange portions 5 in the embodiment are subjected to coining forming to be small in an area of an engaging surface with a concave hole 20 as compared with the fourth embodiment and formed to be shaped substantially trapezoidal or semi-circular in cross section.

In this manner, even when a coined surface is formed to be small, the plurality of flange portions 5 engage with an inner surface of the concave hole 20, so that stability is achieved for the flange portions 5 or the traction hook 1 to maintain safety in mooring while coining forming is correspondingly made easy and volume production and reduction in cost are accomplished.

On the other hand, an interval h between the flange portions 5, 5 is in the range of 1/2 to 2/1 the diameter or an outside diameter d of the shank 2 positioned therebetween.

In this manner, by providing the plurality of flange portions 5 with a spacing therebetween, stability for the flange portions 5 or the traction hook 1 and reduction in load for the flange portions 5 are achieved and volume production by forged forming and reduction in cost are achieved for the traction hook 1 as compared with manufacture of a single flange portion 5.

In addition, while in the embodiments or configuration of application described above, the connecting member 8 formed with the female thread portion 9 is mounted to a vehicle side and the male thread portion 4 of the traction hook 1 is screwed into the female thread portion 9, a construction is also possible on the contrary, in which a connecting rod formed with a male thread portion 4 is mounted to a vehicle side, a connecting member 8 formed at one end thereof with a hook portion 3 and at the other end thereof with a female thread portion 9 is provided, and the female thread portion 9 of the connecting member 8 is screwed into the male thread portion 4 of the rod. By doing this, various traction hooks and various connecting members are obtained.

Also, there is an advantage that a tough and safe clamping can be realized by using a thread part of the invention as subjected to forged forming on a thread clamped portion of a large-sized machine and a vehicle, on which a large load and an alternating load are applied.

In this manner, a method of manufacturing a vehicular traction apparatus and a vehicular traction hook, and a method of manufacturing a vehicular connecting member, according to the invention, are suited to, for example, an automobile traction apparatus since a hook portion of a traction hook is mounted in a predetermined orientation to a connecting member on an automobile, generation of rolling and looseness of the traction hook by vibrations and an external force at the time of traction is prevented, reliability and safety in traction are ensured, the traction hook is smoothly mounted to the connecting member, and it is possible to increase the parts in strength, to make them small in size and weight, to facilitate processing them, and to manufacture them at low cost.

The invention claimed is:

1. A vehicular traction apparatus in combination with a vehicle for stabilizing the vehicle relative to a level surface, comprising:
   a traction hook defining a one-piece construction including a shank portion and an eyelet portion oppositely disposed and coaxial relative to one another therethroughout, the shank portion having a male thread portion and the eyelet portion defining an opening for receiving a first end of a traction member a second end of which is adapted to be connected to said level surface, said level surface being perpendicular relative to vertical thereat; and
   a connecting member mounted to the vehicle and defining a longitudinal axis, the connecting member and the longitudinal axis being horizontally disposed with respect to vertical so as to be parallel to said level surface when mounted to said vehicle, the connecting member having a hollow cylindrical shape defining a female thread portion being fully threadedly engaged by the male thread portion of the shank portion of the traction hook so as to provide no clearance therebetween and so that said traction hook is free from rotation with respect to said connecting member,
   a starting and an ending location of the male thread portion on the shank portion being predetermined so that upon full threaded engagement thereof with the connecting member the eyelet portion of the traction hook is disposed within a predetermined angular range in which a plane of the eyelet portion is set at an angle with respect to vertical, said predetermined angular range being 100°-150°,
      wherein, when the vehicle is parked on the level surface, the traction hook is mounted to the vehicle within the predetermined angular range, and the first end of the traction member is received into the eyelet portion and the second end of the traction member is operatively connected to the level surface and positioned below the traction hook, whereupon anchoring of the vehicle to the level surface, vibrations and a bending moment generated by the traction member are directed in a clockwise direction with respect to vertical so as to be directed along the engagement direction of the male thread portion of the shank portion with the female thread portion of the connecting member so as to prevent loosening therebetween.

2. The vehicular traction apparatus in combination with the vehicle according to claim 1, wherein a single or plural protruding flange portions are provided in a position close to the male thread portion, and the flange portion is arranged to engage with an inner rim of a concave hole of the connecting member.

3. The vehicular traction apparatus in combination with the vehicle according to claim 2, wherein a flat surface engageable with the inner surface of the concave hole is formed on an outer peripheral surface of the flange portion.

4. The vehicular traction apparatus in combination with the vehicle according to claim 2, wherein two of the flange portions and a shank therebetween are provided and an interval between the two flange portions is in the range 0.5 to two times a diameter of the shank.

5. The vehicular traction apparatus in combination with the vehicle according to claim 1, wherein side cut portions, on which male threads are not worked, are formed on both sides of the male thread portion.

6. The vehicular traction apparatus in combination with the vehicle according to claim 1, wherein the male thread portion of the traction hook and the female thread portion of the connecting member comprise a plurality of thread ridges with trapezoidal threads or round threads.

7. The vehicular traction apparatus in combination with the vehicle according to claim 1 or 6, wherein the male thread portion and the female thread portion are formed to be substantially the same in thread portion length.

8. The vehicular traction apparatus in combination with the vehicle according to claim 2, wherein the hook portion, the male thread portion and the flange portion of the traction hook are produced integrally by forged forming.

9. The vehicular traction apparatus in combination with the vehicle according to claim 1, wherein the female thread portion of the connecting member is formed corresponding to at least one of the original position and the terminal position of the male thread portion of the traction hook.

10. The vehicular traction apparatus in combination with the vehicle according to claim 1, wherein the connecting member is formed in a hollow cylindrical shape, a concave hole is provided at one or both ends of the inner surface of the connecting member, and the female thread portion is provided adjacent to the concave hole.

11. The vehicular traction apparatus in combination with the vehicle according to claim 1, wherein a positioning portion is provided axially on an outer peripheral surface of the connecting member, and the positioning portion is formed in a flat surface, a rib-shaped projection, or a concave groove.

12. The vehicular traction apparatus in combination with the vehicle according to claim 10, wherein the connecting member is formed by joining and connecting a plurality of connecting pieces together, and the female thread portions and the concave holes are formed on the connecting pieces.

13. The vehicular traction apparatus in combination with the vehicle according to claim 10, wherein the female thread portions and the concave hole of the connecting member are produced integrally by forged forming.

14. The vehicular traction apparatus in combination with the vehicle according to claim 13, wherein the connecting member comprises connecting pieces that include a plurality of concave and convex portions on joint surfaces of the connecting pieces which are produced integrally by forged forming, and the concave and convex portions are provided to fit each other.

15. The vehicular traction apparatus in combination with the vehicle according to claim 1, wherein the level surface is a floor surface of a ship.

* * * * *